United States Patent
Matsushima et al.

(10) Patent No.: US 10,129,428 B2
(45) Date of Patent: Nov. 13, 2018

(54) SYSTEM, IMAGE FORMING DEVICE, AND INFORMATION PROCESSING METHOD

(71) Applicants: Hiroyuki Matsushima, Kanagawa (JP); Ryoh Takemoto, Tokyo (JP)

(72) Inventors: Hiroyuki Matsushima, Kanagawa (JP); Ryoh Takemoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 15/440,632

(22) Filed: Feb. 23, 2017

(65) Prior Publication Data
US 2017/0251122 A1  Aug. 31, 2017

(30) Foreign Application Priority Data

Feb. 29, 2016  (JP) .................................. 2016-038026
Jan. 25, 2017  (JP) .................................. 2017-011429

(51) Int. Cl.
*G06K 15/00* (2006.01)
*H04N 1/00* (2006.01)
*H04N 1/44* (2006.01)

(52) U.S. Cl.
CPC ..... *H04N 1/00973* (2013.01); *H04N 1/00244* (2013.01); *H04N 1/00464* (2013.01); *H04N 1/4433* (2013.01); *H04N 2201/0094* (2013.01)

(58) Field of Classification Search
CPC .................................................. G06F 21/105
See application file for complete search history.

(56) References Cited

U.S. PATENT DOCUMENTS

| 2008/0021977 A1* | 1/2008 | Jones .................... G06F 17/241 709/217 |
| 2009/0276333 A1 | 11/2009 | Cortes et al. |
| 2010/0205274 A1* | 8/2010 | Gharabally .............. G06F 8/61 709/217 |
| 2011/0004874 A1* | 1/2011 | Nakashima ........... G06F 21/121 717/175 |
| 2014/0280462 A1 | 9/2014 | Gharabally et al. |

FOREIGN PATENT DOCUMENTS

| JP | 2010-182309 | 8/2010 |
| JP | 5400869 | 11/2013 |
| JP | 2015-111613 A | 6/2015 |
| JP | 2016-085659 | 5/2016 |

* cited by examiner

*Primary Examiner* — King Poon
*Assistant Examiner* — Michael Burleson
(74) *Attorney, Agent, or Firm* — Harness, Dickey & Pierce P.L.C.

(57) ABSTRACT

A system includes: a server and at least one device. The server includes a control unit configured to transmit Web content data including display information indicating at least one application that is able to be used by a device and at least one application command to cause the device to perform processing related to the at least one application. The device includes: a Web browser including: a display control unit configured to perform control for displaying a screen based on the Web content data on a display unit; and an execution unit configured to request execution of an application command included in the Web content data in accordance with an operation performed by a user via the screen; and a processing execution unit configured to, based on a request from the Web browser, perform processing related to an application corresponding to the request.

20 Claims, 26 Drawing Sheets

FIG.5

| DEVICE TYPE ID | DEVICE TYPE NAME | DEVICE TYPE CODE |
|---|---|---|
| M001 | Machine-001 | 3F08 |
| M002 | Machine-002 | 4G12 |
| M003 | Machine-003 | 5R33 |

FIG.6

| APPLICATION ID | LICENSE KEY | DEVICE TYPE ID | VERSION INFORMATION |
|---|---|---|---|
| S001 | S001-111-222 | M001<br>M002 | 1.1<br>1.0 |
| S002 |  | M001<br>M003 | 1.1<br>1.0 |
| S003 | S003-555-666 | M001<br>M003 | 2.2<br>2.1<br>2.0 |

FIG.7

| APPLICATION ID | STATE INFORMATION |
|---|---|
| S001 | PUBLIC |
| S002 | PUBLIC |
| S003 | PUBLIC |
| S004 | PUBLIC |
| S005 | CLOSED |
| S006 | PUBLIC |
| S007 | CLOSED |
| S008 | PUBLIC |
| S009 | PUBLIC |

FIG.8

| APPLICA-TION ID | LANGUAGE INFORMATION | DISPLAY NAME | INTRODUCTION MESSAGE |
|---|---|---|---|
| S001 | JAPANESE | EASY COPIER | YOU CAN COPY EASILY |
| S001 | ENGLISH | Easy Copier | You can copy easily |
| S002 | JAPANESE | OCR APPLICATION | YOU CAN PERFORM OCR PROCESSING ON TEXT DOCUMENT |
| S002 | FRENCH | OCR app | Vous pouvez effectuer l' OCR pour les documents texte |
| S003 | JAPANESE | TRANSLATION APPLICATION | YOU CAN TRANSLATE LANGUAGE INTO FIVE LANGUAGES |

(Columns DISPLAY NAME and INTRODUCTION MESSAGE are grouped under APPLICATION EXPLANATION INFORMATION)

FIG.11

| APPLICA-TION ID | LICENSE CLASSIFICATION | LICENSE FORM | EXPIRATION DATE | NUMBER OF VOLUMES |
|---|---|---|---|---|
| S001 | Lic1 | FREE | NONE (INDEFINITE) | INDEFINITE |
| S003 | Lic2 | TRIAL | THREE MONTHS | INDEFINITE |
| S002 | Lic3 | PAY | ONE YEAR | 1 |

FIG.12

| LICENSE CLASSIFICATION | LICENSE KEY | NUMBER OF LICENSES IN USE | NUMBER OF USED LICENSES |
|---|---|---|---|
| Lic1 | S001-111-222 | 1000 | 100 |
| Lic2 | S003-555-666 | 500 | 300 |
| Lic3 | S002-777-888 | 1 | 0 |
| Lic3 | S002-777-889 | 0 | 0 |

| LICENSE KEY | MACHINE NUMBER | EXPIRATION DATE | VALID STATE INFORMATION |
|---|---|---|---|
| S001-111-222 | 3F08-00001 | NONE (INDEFINITE) | VALID |
| S001-111-222 | 4G12-00002 | NONE (INDEFINITE) | INVALID |
| S003-555-666 | 3F08-00001 | 2015/12/31 | VALID |
| S003-555-666 | 5R33-00003 | 2015/06/30 | INVALID |
| S002-777-888 | 3F08-00004 | 2016/09/30 | VALID |

SCREEN INFORMATION REQUEST

```
GET /apps?serialId=5R33-00003 HTTP/1.1
Host: www.example.com
Accept-Language: ja-JP
```

FIG.22

RESPONSE

```
HTTP/1.1 200 OK
Content-Type: application/json; charset=UTF-8

[
    {
        "appId": "S002",
        "appType": "install",
        "name": "OCR APPLICATION",
        "licenseKey": "",
        "description": "YOU CAN PERFORM OCR PROCESSING ON TEXT DOCUMENT",
        "version": "1.1",
        "icon": "http://www.example.com/apps/S002/icon.png",
        "licenseInfo": "http://www.example.com/apps/S002/license.html"
    },
    {
        "appId": "S003",
        "appType": "install",
        "name": "TRANSLATION APPLICATION",
        "licenseKey": "S003-555-666",
        "description": "YOU CAN TRANSLATE LANGUAGE INTO FIVE LANGUAGES",
        "version": "2.2",
        "icon": "http://www.example.com/apps/S003/icon.png",
        "licenseinfo": "http://www.example.com/apps/S003/license.html"
    }
]
```

FIG.26

```
// INSTALL
<form name="form1">
    <input type="button" name="install" value="OK" onClick="install('S001', 'S001-111-222')">
</form> function install( appId, licenseKey ){
    appMgmt.install( appId, licenseKey )
}
```

TO INSTALL THIS APPLICATION,
LICENSE KEY IS REQUIRED.
INPUT LICENSE KEY.

[ CANCEL ]    [ OK ]

| APPLICATION ID | CURRENT VERSION |
|---|---|
| S001 | 1.0 |
| S002 | 1.1 |
| S003 | 2.0 |

| APPLICATION ID | DETAIL INFORMATION (VERSION) |
|---|---|
| S001 | 1.1 |
| S002 | 1.1 |
| S003 | 2.2 |

FIG.31

```
// UPDATE
<form name="form2">
    <input type="button" name="update" value="UPDATE" onClick="update('S001')">
</form> function update( appId ){
    appMgmt.update( appId )
}
```

FIG.34

```
// DELETE
<form name="form3">
  <input type="button" name="uninstall" value="OK" onClick="uninstall('S001', 'S001-111-222')"> </form> function uninstall( appId, licenseKey ){
    uninstall( appId, licenseKey )
}
```

SYSTEM, IMAGE FORMING DEVICE, AND INFORMATION PROCESSING METHOD

CROSS-REFERENCE TO RELATED APPLICATIONS

The present application claims priority under 35 U.S.C. § 119 to Japanese Patent Application No. 2016-038026, filed on Feb. 29, 2016 and Japanese Patent Application No. 2017-011429, filed on Jan. 25, 2017. The contents of which are incorporated herein by reference in their entirety.

BACKGROUND OF THE INVENTION

1. Field of the Invention

The present invention relates to a system, an image forming device, and an information processing method.

2. Description of the Related Art

In recent years, various communication devices such as a cellular telephone and a portable information terminal have been widespread, so that applications that can be used in the communication devices have been actively developed. To promote use of these applications, developed are web sites and applications for introducing an application and directly downloading or installing the application in the communication device.

For example, according to Japanese Unexamined Patent Application Publication No. 2010-182309, an application explanation page is provided from a server to a computer device (client device) for each of a plurality of applications held by the server, the application explanation page including a download button (virtual button) displayed therein for requesting download of the application, and the application explanation page is displayed on a display unit of the computer device. Disclosed is a technique in which, when the download button of the application explanation page is selected, download is permitted only when the selected application is supported by the computer device.

However, in the technique disclosed in Japanese Unexamined Patent Application Publication No. 2010-182309, for example, when display content of a page (Web page) for introducing an application that can be used by a device is changed on the server side, a computer program on the device side is required to be changed in accordance with the change in the display content. That is, in the related art, there has been no mechanism in which pages each including display content different for each region are established, for example, by a server that provides a page for introducing an application that can be used by a device (including a form of providing a page itself, and a form of providing information required to generate a page on the device side).

SUMMARY OF THE INVENTION

A system includes a server, and at least one device connected to the server via a network. The server includes a control unit configured to transmit Web content data including at least display information indicating at least one application that is able to be used by a device of the at least one device and at least one application command to cause the device to perform processing related to the at least one application, to the device in response to a request from the device. The device includes a Web browser and a processing execution unit. The Web browser includes a display control unit and an execution unit. The display control unit is configured to perform control for displaying a screen based on the Web content data received from the server, on a display unit. The execution unit is configured to request execution of an application command of the at least one application command included in the Web content data in accordance with an operation performed by a user via the screen to perform processing related to an application corresponding to the application command, of the at least one application. The processing execution unit configured to, based on a request from the Web browser, perform processing related to an application corresponding to the request, of the at least one application.

BRIEF DESCRIPTION OF THE DRAWINGS

FIG. 5 is a diagram illustrating an example of first correspondence information;

FIG. 6 is a diagram illustrating an example of second correspondence information;

FIG. 7 is a diagram illustrating an example of third correspondence information;

FIG. 8 is a diagram illustrating an example of fourth correspondence information;

FIG. 11 is a diagram illustrating an example of fifth correspondence information;

FIG. 12 is a diagram illustrating an example of sixth correspondence information;

FIG. 22 is a diagram illustrating an example of information received as a response to the display information request;

FIG. 26 is a diagram illustrating an example of information notified from an execution unit to a processing execution unit;

FIG. 31 is a diagram illustrating an example of information notified from the execution unit to the processing execution unit;

FIG. 34 is a diagram illustrating an example of information notified from the execution unit to the processing execution unit;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
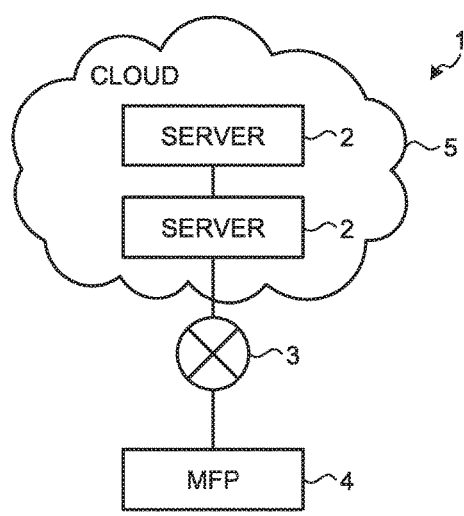
FIG. 1 is a diagram illustrating a configuration example of a system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a system, an image forming device, and an information processing method in which a server that provides a page for introducing an application that can be used by a device can establish pages each including display content different for each region, for example.

The following describes an embodiment of a system, an image forming device, and an information processing method according to the present invention in detail with reference to the attached drawings. In the following description, a multifunction peripheral (MFP) is exemplified as an aspect of the image forming device as an example of a device included in the system, but the embodiment is not limited thereto. The multifunction peripheral is a device having a plurality of different functions such as a copying function, a scanner function, a printer function, and a facsimile function.

FIG. 1 is a diagram illustrating a configuration example of a system (information processing system) 1 according to the embodiment. As illustrated in FIG. 1, the system 1 implements a cloud computing service.

The system 1 includes a cloud 5 and an MFP 4 that is connected to the cloud 5 via a network 3 such as the Internet. The cloud 5 includes a group of server devices including a plurality of servers 2. The number of the servers 2 illustrated in FIG. 1 is merely an example, and the number of the servers 2 to be used is not limited thereto. In the example of FIG. 1, only one MFP 4 is exemplified as the information processing device included in the system 1 that serves as a client when being viewed from the cloud 5 side. However, the embodiment is not limited thereto, and the number and types of devices included in the system 1 are optional. For example, a personal computer (PC) may be included in the system 1 as the device serving as a client.

The server 2 transmits, in response to a request from the MFP 4, Web content data to the MFP 4, the Web content data including display information that includes information indicating an application that can be used by the MFP 4 and screen information that includes at least an application command indicating a command to cause the MFP 4 to perform processing related to the application. The following describes a specific configuration of the server 2.

Figure 2:
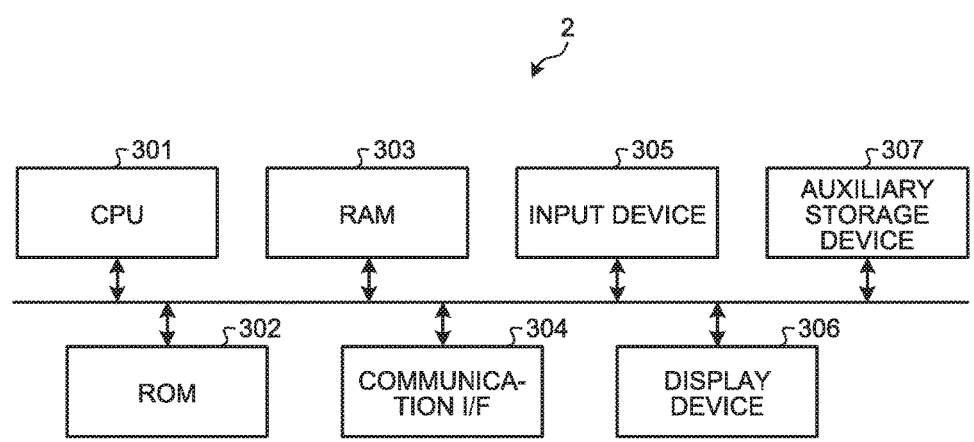
FIG. 2 is a diagram illustrating an example of a hardware configuration of a server.

FIG. 2 is a diagram illustrating an example of a hardware configuration of the server 2. As illustrated in FIG. 2, the server 2 includes a CPU 301, a ROM 302, a RAM 303, a communication I/F 304, an input device 305, a display device 306, and an auxiliary storage device 307. The CPU 301 generally controls an operation of the server 2. The ROM 302 is a non-volatile memory that stores various pieces of data such as a computer program. The RAM 303 is a volatile memory that functions as a working area (work area) for various pieces of processing performed by the CPU 301. The communication I/F 304 is an interface for connecting the server 2 to the network 3. The input device 305 is a device used for an operation input by a user, and includes a mouse, a keyboard, and the like. The display device 306 is a device that displays various pieces of information, and includes a liquid crystal display device and the like. The auxiliary storage device 307 includes a hard disk drive (HDD) and the like.

Figure 3:
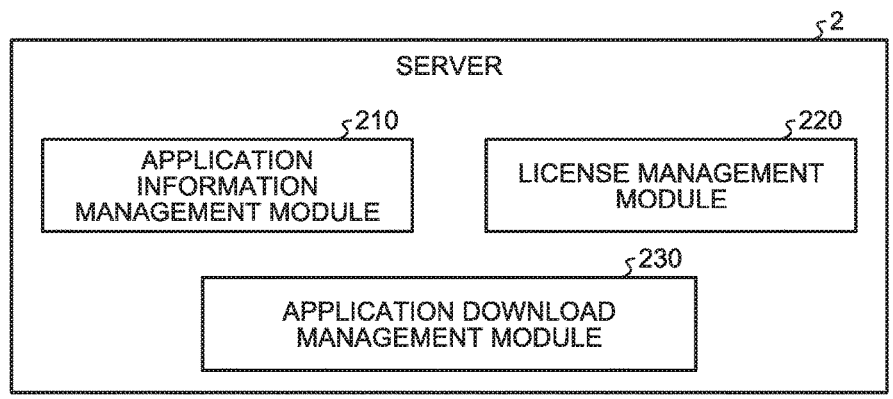
FIG. 3 is a diagram illustrating an example of a function of the server.

FIG. 3 is a diagram illustrating an example of a function of the server 2. As illustrated in FIG. 3, the server 2 includes an application information management module 210, a license management module 220, and an application download management module 230. FIG. 3 exemplifies only the modules related to the embodiment, but the modules included in the server 2 are not limited thereto.

Figure 4:
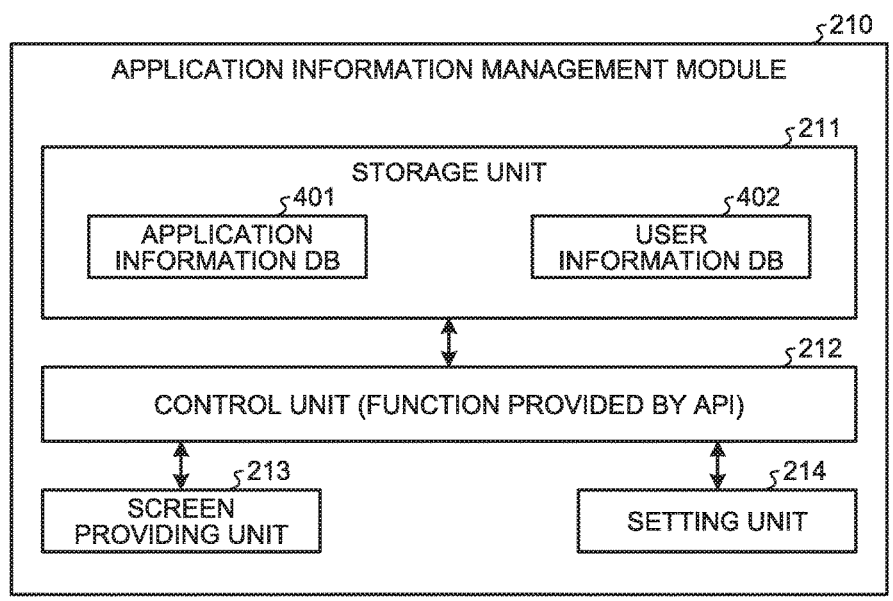
FIG. 4 is a diagram illustrating an example of a function of an application information management module.

FIG. 4 is a diagram illustrating an example of a function of the application information management module 210. The application information management module 210 includes a storage unit 211, a control unit 212, a screen providing unit 213, and a setting unit 214. FIG. 4 mainly exemplifies the functions related to the embodiment, but the functions of the application information management module 210 are not limited thereto.

As illustrated in FIG. 4, the storage unit 211 includes an application information database (hereinafter, referred to as an "application information DB") 401 and a user information database (hereinafter, referred to as a "user information DB") 402.

The application information DB 401 stores, for each of a plurality of applications, state information indicating whether the application is open to the public and device type information for identifying a device type of a device that can use the application, in association with each other. In the embodiment, the application information DB 401 stores first correspondence information illustrated in FIG. 5, second correspondence information illustrated in FIG. 6, third correspondence information illustrated in FIG. 7, and fourth correspondence information illustrated in FIG. 8.

As illustrated in FIG. 5, the first correspondence information is information in which a device type ID assigned to each device type of the MFP 4, a device type name of the MFP 4, and a device type code ("device type information") for identifying the device type of the MFP 4 are associated with each other. For example, a plurality of device type codes may be associated with one device type ID. As illustrated in FIG. 6, the second correspondence information is information in which an application ID for identifying the application, a license key used for authenticating use authority (license) of the application, the device type ID, and version information indicating the latest version of the application identified with the application ID are associated with each other. In this example, the license is not required to be authenticated for the application ID of a free application, so that the license key is associated with the application ID in advance. However, the license is required to be authenticated for the application ID of a pay application, so that the license key is not associated with the application ID.

As illustrated in FIG. 7, the third correspondence information is information in which the application ID and the state information indicating whether the application is open to the public are associated with each other. It can be considered that the state information indicating whether the application is open to the public is associated with the device type information for identifying the device type of the device that can use the application for each of a plurality of applications, by combination of the first correspondence information, the second correspondence information, and the third correspondence information.

As illustrated in FIG. 8, the fourth correspondence information is information in which the application ID, language information indicating a language of a country or a region in which the device is used, a display name of the application identified with the application ID, and a message for introducing the application identified with the application ID are associated with each other. In the following description, a combination of the display name and the message may be referred to as "application explanation information" for explaining the application.

Returning to FIG. 4, the following continues the description of the storage unit 211. The user information DB 402 stores information required for authenticating a user having authority to perform an operation for setting made by the setting unit 214 (described later), for example.

Next, the following describes a function of the control unit 212. Herein, the function of the control unit 212 is provided by an application programming interface (API) on the server 2 side.

For convenience of explanation, the following describes a function of the screen providing unit 213 before describing the function of the control unit 212. When receiving, from the MFP 4, a screen information request for requesting the screen information, the screen providing unit 213 generates Web content data (screen information) including at least an application command, and transmits the Web content data (screen information) to the MFP 4 as a response to the screen information request. The Web content data (screen information) includes, for example, HTML, CSS included in HTML (or referred to by HTML), JavaScript (registered trademark), and the like. A Web browser (display control unit 262 described later) of the MFP 4 displays the Web content data (screen information), and requests display information from the API (control unit 212) of the server 2 using a technique that is called Ajax of JavaScript. For example, when the application command is JavaScript, a script itself may be embedded in HTML, or only a link may be described therein. In this example, the display information request is transmitted to the control unit 212, the display information request including the device type code of the MFP 4 as a transmission source and requesting the display information. Examples of types of the application command according to the embodiment include an installation command, an update command, and an uninstallation command. The installation command indicates a command to install the application. The update command indicates a command to update the application. The uninstallation command indicates a command to delete the installed application and return the state of the MFP 4 to a state before the application is installed.

Figure 9:
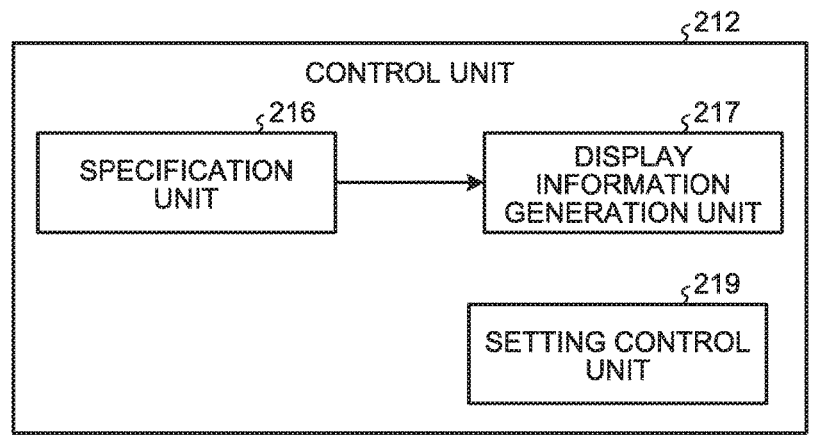
FIG. 9 is a diagram illustrating an example of a function of a control unit.

FIG. 9 is a diagram illustrating an example of a function of the control unit 212. As illustrated in FIG. 9, the control unit 212 includes a specification unit 216, a display information generation unit 217, and a setting control unit 219.

When receiving, from the MFP 4 (device), the display information request including at least the device type code and requesting the display information, the specification unit 216 refers to the information stored in the storage unit 211 (in this example, the application information DB 401) to specify the application corresponding to a combination of the device type code included in the display information request and the state information indicating a state in which the application is open to the public. More specifically, when receiving the display information request from the MFP 4, the specification unit 216 refers to the first correspondence information illustrated in FIG. 5 to select the device type ID associated with the device type code included in the received display information request. Next, the specification unit 216 refers to the second correspondence information illustrated in FIG. 6 to select one or more application IDs associated with the selected device type ID. Subsequently, the specification unit 216 refers to the third correspondence information illustrated in FIG. 7 to select the application ID associated with the state information indicating the state in which the application is open to the public from among the selected one or more application IDs. The application identified with the application ID selected as described above is specified as an application corresponding to a combination of the device type code included in the display information request received from the MFP 4 and the state information indicating the state in which the application is open to the public (that is, as an application that can be used by the MFP 4 as a requesting source of the display information request).

The display information request according to the embodiment includes language information (locale information) indicating a language of a country or a region in which the MFP 4 as a requesting source of the display information request is used, so that the specification unit 216 can specify the application explanation information corresponding to a combination of the application ID specified as described above and the language information included in the display information request received from the MFP 4 by referring to the fourth correspondence information illustrated in FIG. 8. The language information is typically described using Accept-Language header of HTTP.

The following continues the description of FIG. 9. The display information generation unit 217 generates Web content data (display information) indicating the application specified by the specification unit 216, and transmits the generated Web content data (display information) to the MFP 4 as a response to the display information request. The Web content data (display information) according to the embodiment includes application detail information in which, with each application (for example, each application ID) that can be used by the MFP 4 as a requesting source of the display information request, detail information indicating details of the application is associated. Examples of the detail information include the license key, the version information, and the application explanation information.

The setting control unit 219 performs control for reflecting the setting made by the setting unit 214 in the information stored in the storage unit 211. That is, the setting control unit 219 performs control for updating the information stored in the storage unit 211 in accordance with the setting made by the setting unit 214. In this example, the setting unit 214 has a function of setting the display information variably in accordance with an operation performed by the user. For example, the setting unit 214 can set the application explanation information and layout information indicating arrangement of display components on a screen variably in accordance with an operation performed by the user. Accordingly, display content may be varied for each region, for example.

The functions of the control unit 212, the screen providing unit 213, and the setting unit 214 described above can be implemented when the CPU 301 executes a computer program stored in a storage device such as the ROM 302. The storage unit 211 described above can be implemented by the ROM 302, the auxiliary storage device 307 such as an HDD, or the like. In this example, it can be considered that the combination of the control unit 212 and the screen providing unit 213 corresponds to a function ("control unit") of transmitting the Web content data including the display information indicating the application that can be used by the MFP 4 and the screen information including at least the application command in response to a request from the MFP 4.

Figure 10:
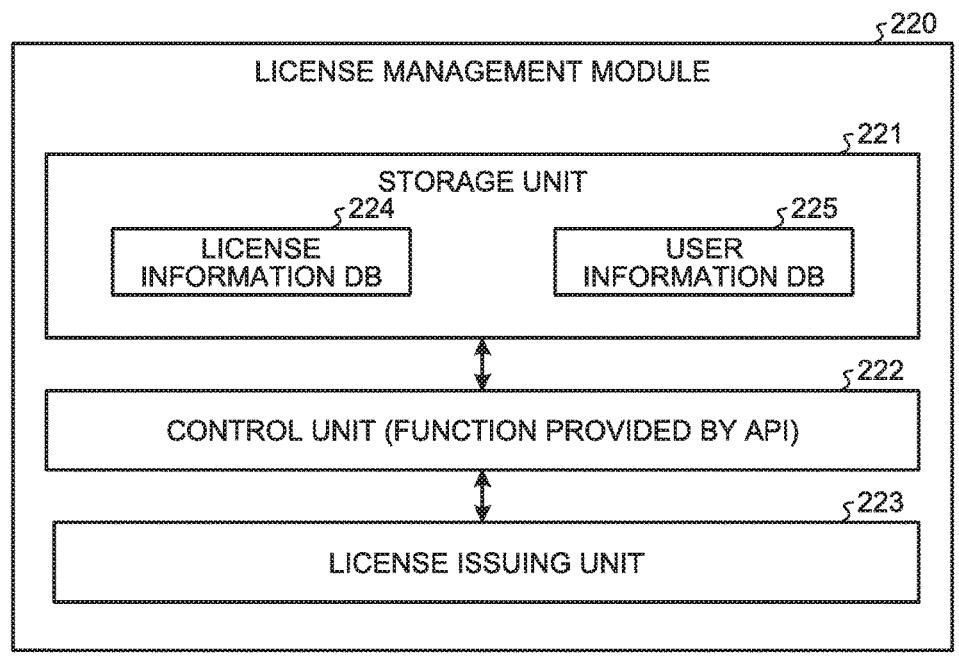
FIG. 10 is a diagram illustrating an example of a function of a license management module.

Next, the following describes a function of the license management module 220. FIG. 10 is a diagram illustrating an example of the function of the license management module 220. As illustrated in FIG. 10, the license management module 220 includes a storage unit 221, a control unit 222, and a license issuing unit 223. FIG. 10 mainly exemplifies the functions related to the embodiment, but the functions of the license management module 220 are not limited thereto.

As illustrated in FIG. 10, the storage unit 221 includes a license information database (hereinafter, referred to as a "license information DB") 224 and a user information database (hereinafter, referred to as a "user information DB") 225.

The license information DB 224 associates information about the use authority (license) of the application with each of a plurality of applications to be stored therein. In the embodiment, the license information DB 224 stores the fifth correspondence information illustrated in FIG. 11, the sixth correspondence information illustrated in FIG. 12, and the seventh correspondence information illustrated in FIG. 13.

Figures 13, 14:
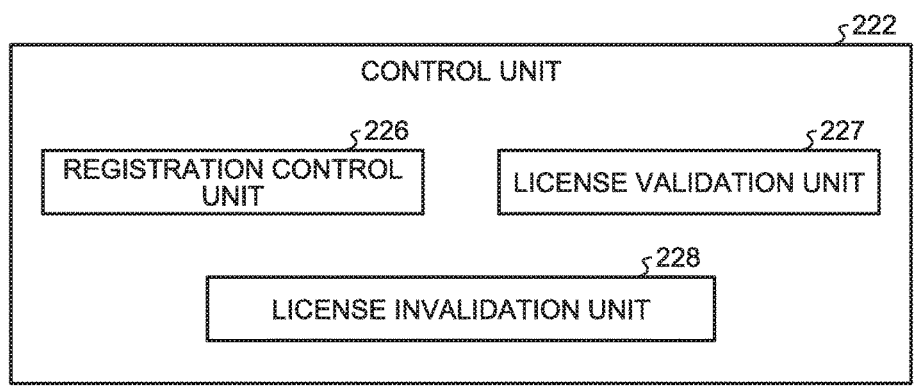
FIG. 13 is a diagram illustrating an example of seventh correspondence information.
FIG. 14 is a diagram illustrating an example of a function of a control unit.

As illustrated in FIG. 11, the fifth correspondence information is information in which the application ID, a license classification indicating a classification of the license, a license form indicating a form of the license (in this example, any of a pay license, a free license, and a trial license), an expiration date indicating a period in which the license is valid, and the number of volumes indicating the number of licenses that can be given are associated with each other. As illustrated in FIG. 12, the sixth correspondence information is information in which the license classification, the license key, the number of licenses in use indicating the number of licenses being used, and the number of used licenses indicating the number of licenses that have been used are associated with each other. As illustrated in FIG. 13, the seventh correspondence information is information in which the license key, a machine number, the expiration date, and valid state information indicating whether the license is valid or invalid are associated with each other.

Returning to FIG. 10, the following continues the description of the storage unit 221. The user information DB 225 stores information required for authenticating the user who can perform an operation for issuing the license, for example. The user information DB 225 may also be used as the user information DB 402 of the application information management module 210.

The following describes a function of the control unit 222. Herein, the function of the control unit 222 is provided by the API on the server 2 side. FIG. 14 is a diagram illustrating an example of the function of the control unit 222. As illustrated in FIG. 14, the control unit 222 includes a registration control unit 226, a license validation unit 227, and a license invalidation unit 228.

The registration control unit 226 performs control for registering information about the license issued by the license issuing unit 223 in the storage unit 221 (license information DB 224). In the embodiment, when accepting an operation of selecting the application ID of the application to which the license is issued and the license classification from the user having authority to perform an operation for issuing the license, the license issuing unit 223 issues the license key corresponding to the application ID and the license classification selected through the accepted operation. The license issuing unit 223 may be configured to merely create a UI described in HTML and the like, and the control unit 222 may have the function of issuing the license in accordance with the operation performed by the user. The registration control unit 226 performs control for registering, in the license information DB 224, information indicating the license key issued by the license issuing unit 223 and the license classification corresponding to the license key. More specifically, when receiving the license key and the license classification corresponding to the license key from the license issuing unit 223, the registration control unit 226 adds a new record (in this example, unit information for each row) including the received license key and license classification to the sixth correspondence information illustrated in FIG. 12.

The license validation unit 227 performs control for validating the license in response to the request from the MFP 4. In this example, when receiving, from the MFP 4, a validation request that includes at least the application ID, the license key, and the machine number and requests validation of the license, the license validation unit 227 checks whether the license key included in the received validation request is present in the sixth correspondence information (refer to FIG. 12) stored in the license information DB 224. If a check result is Yes, the license validation unit 227 refers to the fifth correspondence information (refer to FIG. 11) stored in the license information DB 224, and specifies the expiration date associated with the application ID included in the received validation request. The license validation unit 227 then adds, to the seventh correspondence information illustrated in FIG. 13, a new record (in this example, unit information for each row) in which the license key and the machine number included in the received validation request, the specified expiration date, and the valid state information indicating a valid state are associated with each other. The license validation unit 227 refers to the sixth correspondence information illustrated in FIG. 12, and increments the number of licenses in use associated with the license key included in the validation request received from the MFP 4, by "1" for update. The license validation unit 227 then transmits notice that the state of the license is valid to the MFP 4 as a response to the validation request. The MFP 4 that has received this notice can use the application identified with the application ID included in the validation request.

For example, when the license key included in the validation request received from the MFP 4 is not present in the information stored in the license information DB 224, or when the number of volumes corresponding to the license key included in the validation request received from the MFP 4 has already reached the upper limit, the license validation unit 227 returns an error in response to the validation request from the MFP 4.

The license invalidation unit 228 performs control for invalidating the license in response to the request from the MFP 4. In this example, when receiving, from the MFP 4, an invalidation request that includes at least the license key and the machine number and requests invalidation of the license, the license invalidation unit 228 refers to the seventh correspondence information (refer to FIG. 13) stored in the license information DB 224, and changes the valid state information associated with a combination of the license key and the machine number included in the received invalidation request, into information indicating an invalid state. The license invalidation unit 228 refers to the sixth correspondence information (refer to FIG. 12) stored in the license information DB 224, decrements, by "1", the number of licenses in use associated with the license key included in the invalidation request received from the MFP 4, and increments the number of used licenses by "1" to be updated. The license invalidation unit 228 transmits notice that the state of the license is invalid to the MFP 4 as a response to the invalidation request. The MFP 4 that has received this notice cannot use the application identified with the application ID included in the invalidation request.

The functions of the control unit 222 and the license issuing unit 223 described above can be implemented when the CPU 301 executes a computer program stored in a storage device such as the ROM 302. The storage unit 221 described above can be implemented by the ROM 302 or the auxiliary storage device 307 such as an HDD.

Figure 15:
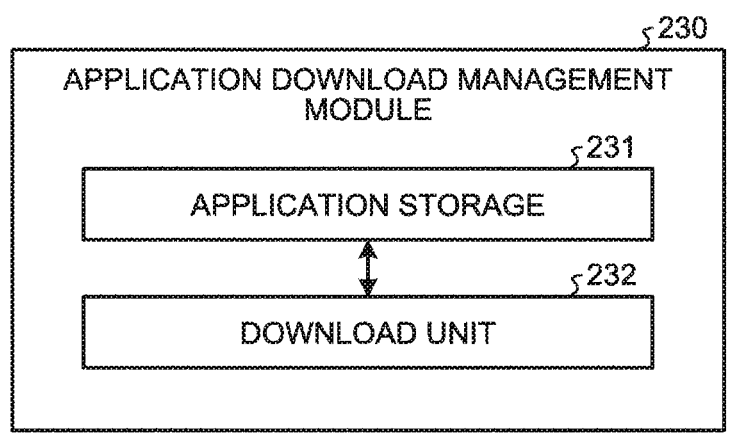
FIG. 15 is a diagram illustrating an example of a function of an application download management module.

Next, the following describes a function of the application download management module 230. FIG. 15 is a diagram illustrating an example of the function of the application download management module 230. As illustrated in FIG. 15, the application download management module 230 includes an application storage 231 and a download unit 232. FIG. 15 mainly exemplifies the functions related to the embodiment, but the functions of the application download management module 230 are not limited thereto.

The application storage 231 stores a plurality of applications to be provided to the MFP 4. In this example, the application storage 231 associates a data file including an application main body with each of a plurality of application IDs to be stored therein. The download unit 232 performs control for transmitting (downloading) any of the applications stored in the application storage 231 to the MFP 4 in response to the request from the MFP 4. In this example, when receiving, from the MFP 4, a download request that includes at least the application ID and requests download of the application, the download unit 232 transmits the application corresponding to the application ID included in the received download request to the MFP 4. More specifically, the download unit 232 refers to the application storage 231, specifies the data file corresponding to the application ID included in the download request received from the MFP 4, and transmits the specified data file to the MFP 4.

The functions of the download unit 232 described above can be implemented when the CPU 301 executes a computer program stored in a storage device such as the ROM 302. The application storage 231 described above can be implemented by the ROM 302 or an auxiliary storage device such as an HDD.

Figure 16:
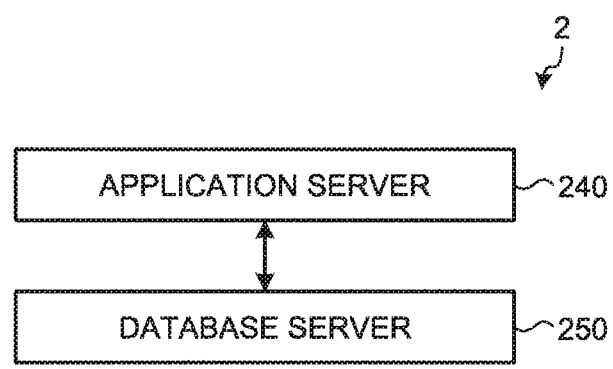
FIG. 16 is a diagram illustrating a modification of the server.

The configuration of the server 2 has been described above. As illustrated in FIG. 1, the server 2 may include a plurality of servers. For example, as illustrated in FIG. 16, the server 2 may include an application server 240 and a database server 250. For example, the application server 240 may include the control unit 212, the screen providing unit 213, the setting unit 214, the control unit 222, and the license issuing unit 223 described above. For example, the application server 240 may include a plurality of servers, and each of the control unit 212, the screen providing unit 213, the setting unit 214, the control unit 222, the license issuing unit 223, and the download unit 232 may be mounted in any of the servers in a distributed manner.

For example, the database server 250 may include the storage unit 211 and the storage unit 221 described above. For example, the database server 250 may include a plurality of servers, and each of the application information DB 401, the user information DB 402, the license information DB 224, the user information DB 225, and the application storage 231 may be mounted in any of the servers in a distributed manner.

Figure 17:
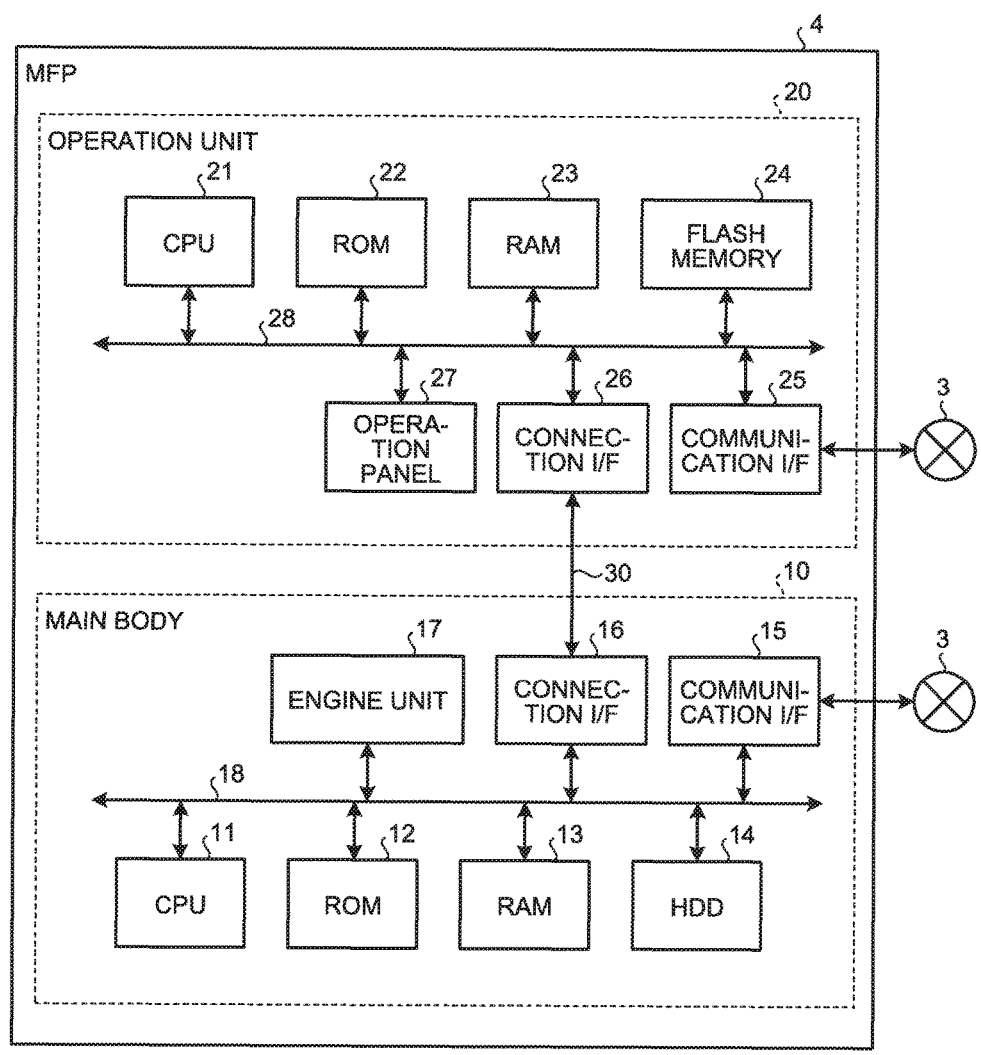
FIG. 17 is a block diagram illustrating an example of a hardware configuration of a multifunction peripheral (MFP)

Next, the following describes a hardware configuration of the MFP 4 with reference to FIG. 17. As illustrated in FIG. 17, the MFP 4 includes a main body 10 that can implement various functions such as a copying function, a scanner function, a facsimile function, and a printer function, and an operation unit 20 that accepts an operation performed by the user. Accepting an operation performed by the user is a concept including accepting information that is input in accordance with the operation performed by the user (including a signal and the like indicating coordinate values on a screen). The main body 10 and the operation unit 20 are connected to each other in a communicable manner via a dedicated channel 30. As the channel 30, for example, a channel of a universal serial bus (USB) standard may be used. Alternatively, a channel of an optional standard may be used in both of a wired manner or a wireless manner.

The main body 10 can operate in accordance with the operation accepted by the operation unit 20. The main body 10 can also communicate with an external device such as a client personal computer (PC), and can operate in accordance with an instruction received from the external device.

First, the following describes a hardware configuration of the main body 10. As illustrated in FIG. 17, the main body 10 includes a CPU 11, a ROM 12, a RAM 13, a hard disk drive (HDD) 14, a communication interface (I/F) 15, a connection I/F 16, and an engine unit 17, which are connected to each other via a system bus 18.

The CPU 11 generally controls an operation of the main body 10. The CPU 11 executes a computer program stored in the ROM 12, the HDD 14, and the like using the RAM 13 as a work area (working area) to control the entire operation of the main body 10, and implements various functions such as the copying function, the scanner function, the facsimile function, and the printer function described above.

The communication I/F 15 is an interface for connecting the main body 10 to the network 3. The connection I/F 16 is an interface for communicating with the operation unit 20 via the channel 30.

The engine unit 17 is hardware that performs processing other than general information processing and communication for implementing the copying function, the scanner function, the facsimile function, and the printer function. For example, the engine unit 17 includes a scanner (image reading unit) that scans an image of a document to be read, a plotter (image forming unit) that performs printing on a sheet material such as a sheet, and a facsimile unit that performs facsimile communication. Additionally, the engine unit 17 may also include specific options such as a finisher that sorts printed sheet materials and an automatic document feeder (ADF) that automatically feeds documents.

Next, the following describes a hardware configuration of the operation unit 20. As illustrated in FIG. 17, the operation unit 20 includes a CPU 21, a ROM 22, a RAM 23, a flash memory 24, a communication I/F 25, a connection I/F 26, and an operation panel 27, which are connected to each other via a system bus 28.

The CPU 21 generally controls an operation of the operation unit 20. The CPU 21 executes a computer program stored in the ROM 22, the flash memory 24, or the like using the RAM 23 as a work area (working area) to control the entire operation of the operation unit 20, and implements various functions (described later) such as displaying information (image) corresponding to an input received from the user.

The communication I/F 25 is an interface for connecting the operation unit 20 to the network 3. The connection I/F 26 is an interface for communicating with the main body 10 via the channel 30.

The operation panel 27 accepts various inputs corresponding to the operation performed by the user, and displays various pieces of information (for example, information corresponding to the accepted operation, information indicating an operating state of the MFP 4, and information indicating a setting state). In this example, the operation panel 27 is configured of a liquid crystal display device (LCD) on which a touch panel function is mounted, but the embodiment is not limited thereto. For example, the operation panel 27 may be configured of an organic electroluminescent (EL) display device on which the touch panel function is mounted. In addition to or in place of these components, an operation unit such as a hardware key and a display unit such as a lamp may be provided.

Figure 18:
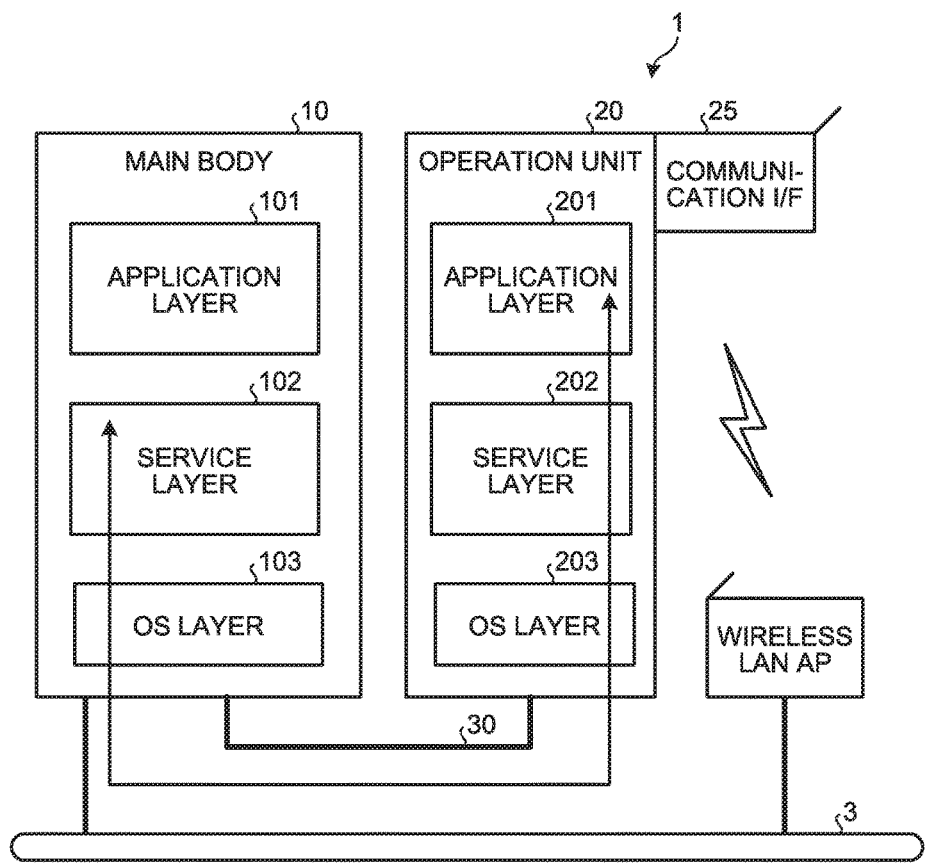
FIG. 18 is a schematic diagram illustrating an example of a software configuration of the MFP.

Next, the following describes a software configuration of the MFP 4. FIG. 18 is a schematic diagram illustrating an example of the software configuration of the MFP 4. As illustrated in FIG. 18, the main body 10 includes an application layer 101, a service layer 102, and an OS layer 103. Entities of the application layer 101, the service layer 102, and the OS layer 103 are various pieces of software stored in the ROM 12, the HDD 14, and the like. When the CPU 11 executes the pieces of software, various functions are provided.

The software of the application layer 101 is application software (in the following description, simply referred to as an "application" in some cases) for operating a hardware resource to provide a predetermined function. Examples of the application include a copying application for providing the copying function, a scanner application for providing the scanner function, a facsimile application for providing the facsimile function, and a printer application for providing the printer function.

The software of the service layer 102 is software interposed between the application layer 101 and the OS layer 103 to provide, to the application, an interface for using a hardware resource included in the main body 10. More specifically, the software of the service layer 102 is software for providing a function of accepting an operation request to the hardware resource and mediating the operation request. As the operation request accepted by the service layer 102, considered are a request for reading by the scanner, a request for printing by the plotter, and the like.

The function as the interface of the service layer 102 is provided not only to the application layer 101 of the main body 10 but also to an application layer 201 of the operation unit 20. That is, the application layer 201 (application) of the operation unit 20 can implement the function using the hardware resource (for example, the engine unit 17) of the main body 10 via the interface function of the service layer 102.

The software of the OS layer 103 is a basic software (operating system (OS)) for providing a basic function of controlling the hardware included in the main body 10. The software of the service layer 102 converts a use request for the hardware resource from various applications into a command that can be interpreted by the OS layer 103, and passes the command to the OS layer 103. When the command is executed by the software of the OS layer 103, the hardware resource operates in response to the request of the application.

Similarly, the operation unit 20 includes the application layer 201, a service layer 202, and an OS layer 203. The application layer 201, the service layer 202, and the OS layer 203 included in the operation unit 20 have the same hierarchical structure as in the main body 10. However, a function provided by the application of the application layer 201 and a type of the operation request that can be accepted by the service layer 202 are different from the main body 10. The application of the application layer 201 may be software for operating the hardware resource included in the operation unit 20 to provide a predetermined function, but is software for providing a user interface (UI) function for mainly performing operation or display related to the functions included in the main body 10 (the copying function, the scanner function, the facsimile function, and the printer function), a function of updating the license file of an installed application, and the like. In this example, the application of the application layer 201 includes an application for providing a function as a Web browser (hereinafter, referred to as a "browser application" in some cases), an application for providing a function of executing an application command included in the Web content data described above (hereinafter, referred to as an "installer" in some cases), and the like.

In the embodiment, the software of the OS layer 103 on the main body 10 side is different from the software of the OS layer 203 on the operation unit 20 side to maintain independence of the functions. That is, the main body 10 and the operation unit 20 operate independently of each other in different operating systems. For example, Linux (registered trademark) can be used as the software of the OS layer 103 on the main body 10 side, and Android (registered trademark) can be used as the software of the OS layer 203 on the operation unit 20 side.

As described above, in the MFP 4 according to the embodiment, the main body 10 and the operation unit 20 operate in different operating systems, so that communication between the main body 10 and the operation unit 20 is performed not as interprocess communication in a common device but as communication between different devices. This communication corresponds to an operation (command communication) of transmitting the information accepted by the operation unit 20 (instruction content from the user) to the main body 10, an operation of notifying the operation unit 20 of an event by the main body 10, and the like. In this case, when the operation unit 20 performs command communication to the main body 10, the function of the main body 10 can be used. Examples of the event notified from the main body 10 to the operation unit 20 include an execution state of the operation in the main body 10 and content set in the main body 10.

In the embodiment, electric power is supplied to the operation unit 20 from the main body 10 via the channel 30, so that power supply control of the operation unit 20 can be performed separately from (independently of) power supply control of the main body 10.

Figure 19:
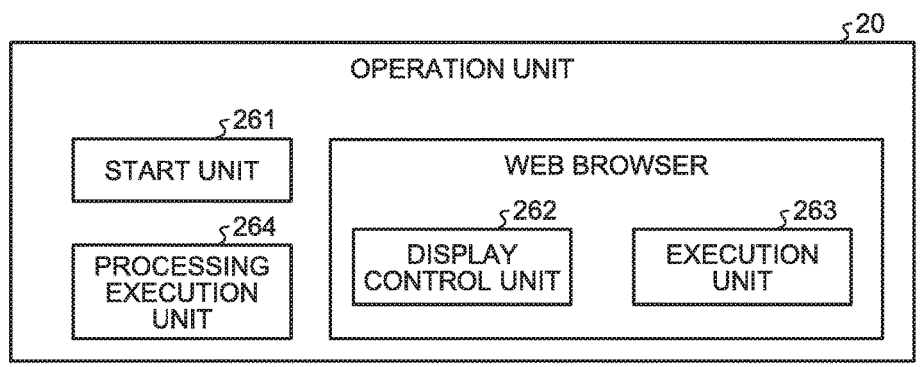
FIG. 19 is a diagram illustrating an example of a function of an operation unit.

FIG. 19 is a diagram illustrating an example of a function of the operation unit 20 according to the embodiment. As illustrated in FIG. 19, the operation unit 20 includes a start unit 261, a display control unit 262, an execution unit 263, and a processing execution unit 264. FIG. 19 mainly exemplifies the functions related to the embodiment, but the functions of the operation unit 20 are not limited thereto. As illustrated in FIG. 19, the display control unit 262 and the execution unit 263 are implemented in a Web browser.

Figures 20, 21:
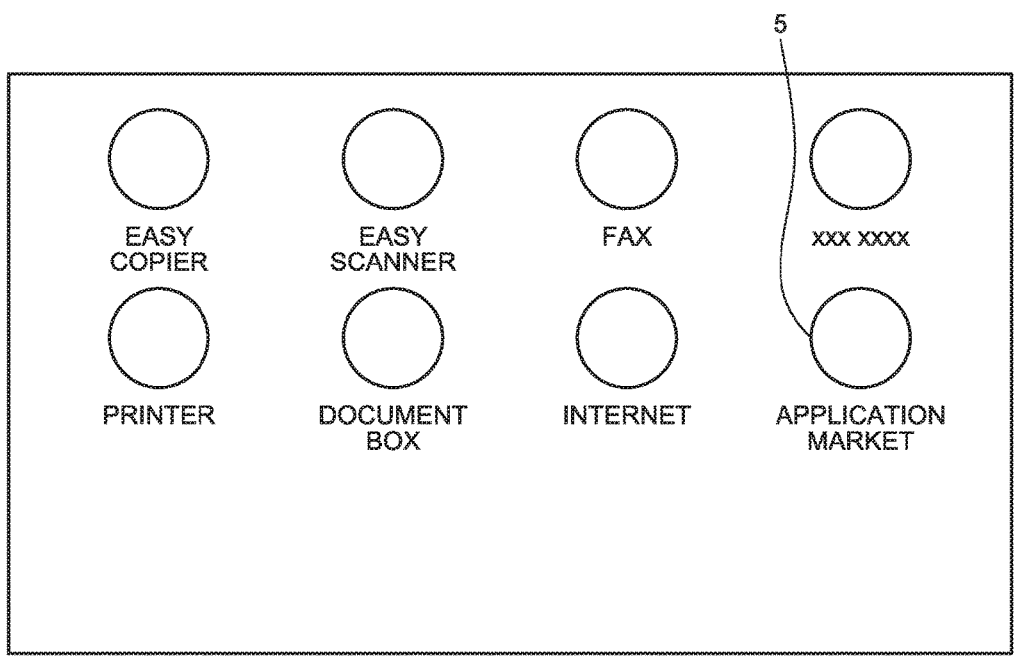
FIG. 20 is a diagram illustrating an example of an operation screen.
FIG. 21 is a diagram illustrating an example of a display information request.

The start unit 261 starts the browser application providing a function as a Web browser in accordance with an operation performed by the user. For example, when accepting pressing of an icon 5 having a name of "application market" in a state in which the operation screen illustrated in FIG. 20 is displayed on the operation panel 27, the start unit 261 performs control for acquiring a URL indicating a location of the server 2 on the network 3, and for starting the browser application.

The started browser application transmits the screen information request described above as an HTTP request to the server 2 designated by the URL received from the start unit 261, and receives the Web content data (screen information) as a response (HTTP response) to the screen information request. In this example, HTML and CSS/JavaScript included in HTML (or referred to by HTML) are received as the Web content data (screen information). The browser application interprets and executes JavaScript, transmits the display information request described above to the server 2 as the HTTP request using Ajax, and receives the Web content data (display information) including at least the application command as a response (HTTP response) to the display information request. FIG. 21 is a diagram illustrating an example of the display information request, and FIG. 22 is a diagram illustrating an example of information received as a response to the display information request.

The browser application performs control for displaying, on the operation panel 27 (display unit), a screen configured based on the Web content data (the screen information and the display information) received from the server 2. In this case, the function of the display control unit 262 is provided by the browser application. As described above, in this example, the display control unit 262 generates the screen based on the Web content data (the screen information and the display information) received from the server 2, and displays the generated screen on the operation panel 27. The display control unit 262 can cause the Web content data (the screen information and the display information) received from the server 2 to be held by a storage device such as the flash memory 24, read the Web content data (the screen information and the display information) as needed, and generate the screen using the read Web content data (the screen information and the display information).

In this example, the display control unit 262 can specify the application command selected in accordance with the operation performed by the user on the screen (a screen configured based on the Web content data (the screen information and the display information)) displayed on the operation panel 27, and notify the execution unit 263 of the specified application command. For example, the display control unit 262 can specify, as JavaScript and a custom scheme, the application command selected by the user.

Among application commands included in the Web content data, the execution unit 263 executes an application command (an application command notified from the display control unit 262) included in the Web content data in accordance with the operation performed by the user via the screen displayed on the operation panel 27, and requests the MFP 4 to perform processing related to the application corresponding to the application command. In this case, the function of the execution unit 263 is provided by the API on the MFP 4 side. The MFP 4 can call the API from a Web application arranged in the server 2 to be able to be used by the browser application of the operation unit 20.

Based on the request from the Web browser (execution unit 263), the processing execution unit 264 performs processing related to the application corresponding to the request.

As described above, examples of the application command included in the Web content data received from the server 2 include the installation command, the update command, and the uninstallation command.

The following exemplifies a case in which the installation command is selected in accordance with the operation performed by the user on the screen configured based on the Web content data (the screen information and the display information) received from the server 2. In this case, the execution unit 263 notifies the processing execution unit 264 of the installation command selected in accordance with the operation performed by the user, and the processing execution unit 264 executes the installation command notified from the execution unit 263. The following describes details.

Figure 23:
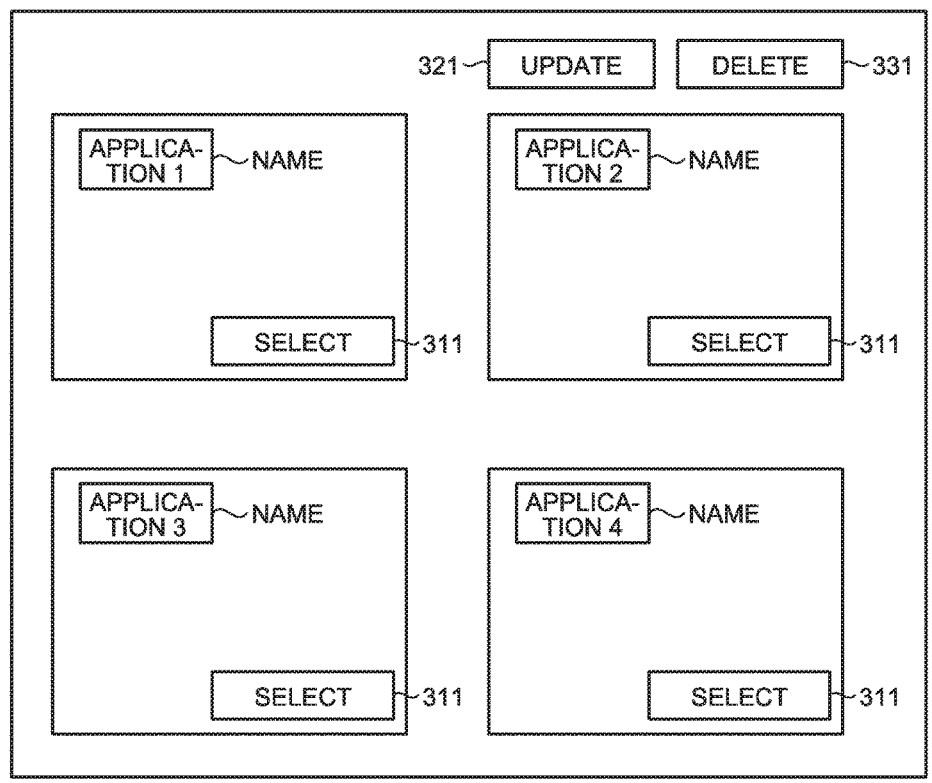
FIG. 23 is a diagram illustrating an example of an application list screen.

In this example, the display control unit 262 performs control for displaying, on the operation panel 27, an application list screen indicating a list of applications that can be used by the MFP 4 using the Web content data (the screen information and the display information) received from the server 2. FIG. 23 is a diagram illustrating an example of the application list screen. In the example of FIG. 23, the application list screen displays, for each application that can be used by the MFP 4, at least the name of the application and an application select button 311 for selecting the application. In the example of FIG. 23, the application list screen also displays an update select button 321 for selecting update of the application and a deletion select button 331 for selecting deletion of the application. Specific content thereof will be described later.

Figure 24:
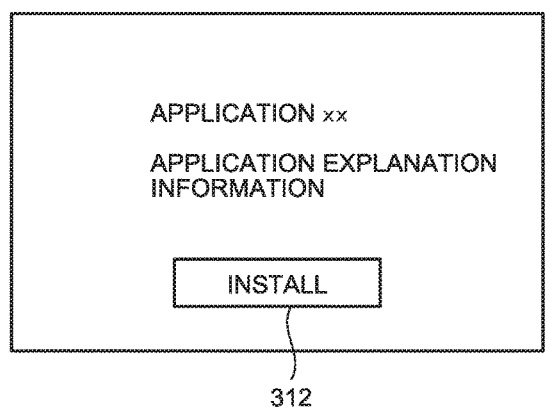
FIG. 24 is a diagram illustrating an example of an installation instruction screen.

When accepting pressing of any application select button 311, the display control unit 262 performs control for displaying, on the operation panel 27, an installation instruction screen for indicating specific content of the corresponding application and accepting an instruction to execute installation using the display information received from the server 2. FIG. 24 is a diagram illustrating an example of the installation instruction screen. In the example of FIG. 24, the installation instruction screen displays application explanation information of the corresponding application and an installation button 312 for instructing to execute installation. In this example, pressing of the installation button 312 means selection of the installation command (or selection of an application desired to be installed).

Figure 25:
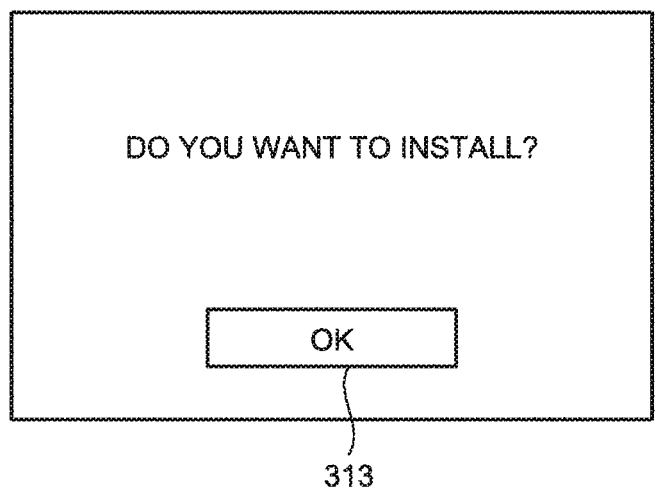
FIG. 25 is a diagram illustrating an example of an installation confirmation screen.

In this example, when accepting pressing of the installation button 312, the display control unit 262 performs control for displaying, on the operation panel 27, an installation confirmation screen for finally confirming execution of installation. FIG. 25 is a diagram illustrating an example of the installation confirmation screen. In the example of FIG. 25, the installation confirmation screen displays a confirmation button 313 for instructing that execution of installation is finally approved. In this example, the installation command is attached to the confirmation button 313 in a JavaScript format. When accepting pressing of the confirmation button 313, the execution unit 263 notifies the processing execution unit 264 of the installation command attached to the pressed confirmation button 313. The processing execution unit 264 then executes the installation command. FIG. 26 is a diagram illustrating an example of the information (JavaScript attached to the confirmation button 313) notified from the execution unit 263 to the processing execution unit 264 in this case.

Figures 27, 28:
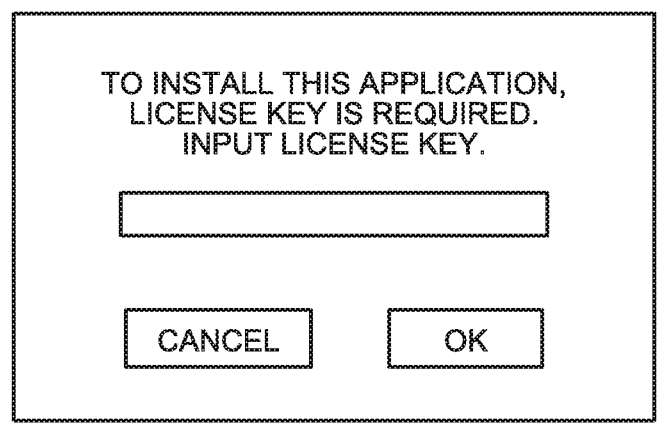
FIG. 27 is a diagram illustrating an example of an input screen.
FIG. 28 is a diagram illustrating an example of application management information.

In the embodiment, when the display information received from the server 2 includes the license key used for authenticating use authority of the application as a target of the installation command that is selected in accordance with the operation performed by the user, the execution unit 263 notifies the processing execution unit 264 of the license key and the installation command, and when the display information received from the server 2 does not include the license key, the execution unit 263 performs control for displaying an input screen for urging input of the license key. More specifically, when the license key for authenticating the use authority of the application is not included in detail information corresponding to the application as a target of the installation command that is selected in accordance with the operation performed by the user in the application detail information in the display information received from the server 2, the display control unit 262 performs control for displaying the input screen for urging input of the license key, and when the license key is included in the detail information, the display control unit 262 notifies the processing execution unit 264 of the license key and the installation command. More specifically, when accepting pressing of the installation button 312 described above, the display control unit 262 checks whether the license key is included in the detail information corresponding to the application selected by the user in the application detail information in the display information received from the server 2. When the license key is not included in the detail information, the display control unit 262 performs control for displaying the input screen for urging input of the license key without displaying the installation confirmation screen in FIG. 25, and the execution unit 263 notifies the processing execution unit 264 of the input license key and the selected installation command. FIG. 27 is a diagram illustrating an example of the input screen. The same installation command as in FIG. 26 is attached to an OK button in FIG. 27. In this case, a character string input to a license key input region is given as a second argument of appMgmt.install function.

Next, the following exemplifies a case in which the update command is selected in accordance with the operation performed by the user on the screen configured based on the Web content data (the screen information and the display information) received from the server 2. In this example, the display control unit 262 specifies, from among installed applications, the application the current version of which is different from a version indicated by the detail information corresponding to the application in the application detail information included in the display information received from the server 2 in accordance with the operation performed by the user. When the update command corresponding to the specified application is selected in accordance with the operation performed by the user, the execution unit 263 notifies the processing execution unit 264 of the selected update command. The processing execution unit 264 executes the update command notified from the execution unit 263. The following describes details.

When accepting pressing of the update select button 321 displayed on the application list screen illustrated in FIG. 23, the display control unit 262 acquires the display information received from the server 2 and application management information in which, with each application installed in the MFP 4, the current version of the application is associated. In this example, the processing execution unit 264 manages the application management information described above, so that the execution unit 263 requests the application management information from the processing execution unit 264, and the display control unit 262 acquires the application management information. The display control unit 262 then specifies, as an application as an update target, the application the current version of which in the application management information is different from a version indicated by the detail information corresponding to the application in the application detail information included in the display information received from the server 2 from among the applications installed in the MFP 4. For example, the application management information is assumed to have an aspect of FIG. 28, and the application detail information included in the display information received from the server 2 is assumed to have an aspect of FIG. 29. In this case, the application ID "S001" and the application ID "S003" are specified as the applications as update targets.

Figures 29, 30:
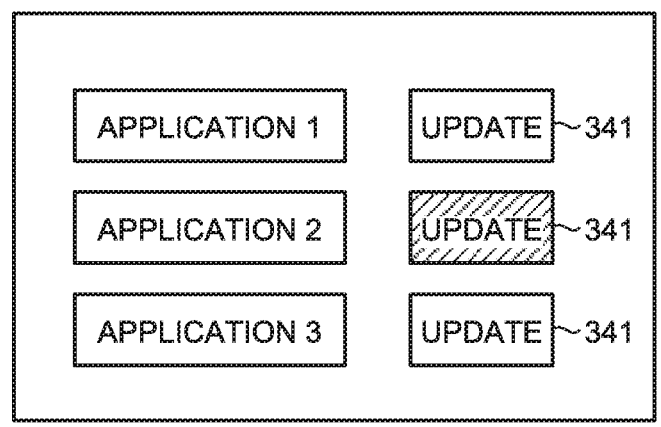
FIG. 29 is a diagram illustrating an example of application detail information.
FIG. 30 is a diagram illustrating an example of an update instruction screen.

The display control unit 262 performs control for displaying, on the operation panel 27, an update instruction screen for accepting an update instruction of the application for each application specified as described above. FIG. 30 is a diagram illustrating an example of the update instruction screen. The update instruction screen displays an update instruction button 341 for accepting an update instruction for the application for each of a plurality of applications. In this example, the update command indicating the command to update the application is attached to the update instruction button 341 corresponding to the application as an update target (the application specified as described above). In the example of FIG. 30, the update instruction screen displays both of the application as an update target (in the example of FIG. 30, the applications 1 and 3) and the application not as an update target (in the example of FIG. 30, the application 2), and the update instruction button 341 corresponding to the application not as an update target is in an inoperable state (a state in which pressing cannot be accepted). That is, the update instruction screen separately displays the application as an update target (the application specified as described above) and the application not as an update target, but the embodiment is not limited thereto. For example, the update instruction screen may display only the application as an update target in association with the update instruction button 341 in an operable state. For example, the display control unit 262 can perform control for displaying information indicating the number of applications specified as described above (applications as update targets). That is, the display control unit 262 can perform control for displaying information indicating the number of applications, the current version of each of the applications being different from the version indicated by the detail information corresponding to the application in the application detail information, among the applications installed in the MFP 4. When accepting pressing of the update instruction button 341, the execution unit 263 notifies the processing execution unit 264 of the update command attached to the update instruction button 341. FIG. 31 is a diagram illustrating an example of information notified from the execution unit 263 to the processing execution unit 264 in this case.

In this example, the update instruction button 341 is individually arranged for each application as an update target, but the embodiment is not limited thereto. For example, there may be arranged a button for instructing to collectively update the applications as update targets. In this configuration, when pressing of the button is accepted, update commands for all applications as update targets are collectively selected. In short, the application command may include a collective update command indicating a command to collectively update the applications, the current version of each of the applications being different from the version indicated by the detail information corresponding to the application in the application detail information, among the applications installed in the MFP 4. In this case, when the collective update command is selected (when pressing of the button is accepted for instructing to collectively update the applications as update targets), the display control unit 262 may specify the applications, the current version of each of the applications being different from the version indicated by the detail information corresponding to the application in the application detail information from among the applications installed in the MFP 4, and the execution unit 263 may notify the processing execution unit 264 of the update command corresponding to the specified applications.

For example, the server 2 may have a function of specifying the application as an update target. In this case, for example, the display control unit 262 can acquire the application management information described above from the processing execution unit 264 before the display information request is transmitted, and can transmit, to the server 2, the display information request to which the acquired application management information is added. The server 2 compares, for each application ID included in the application management information received from the MFP 4, a version associated with the application ID in the application management information with a version associated with the application ID in the application information DB 401 (second correspondence information) managed by the server 2, and can specify a different application ID as the application ID as an update target. The server 2 may be configured to transmit, to the MFP 4, information indicating the application ID specified as an update target being included in the display information. Additionally, for example, the server 2 may be configured to manage the applications installed in the MFP 4 (manage the application management information described above). In this case, for example, the server 2 can update the application management information at a timing of validating or invalidating the license, or update the application management information at a timing of updating the application. In this case, the current version of the application installed in the MFP 4 is not required to be acquired from the MFP 4, so that the application as an update target can be determined only by the server 2, and a processing load of the MFP 4 can be reduced.

Next, the following exemplifies a case in which the uninstallation command is selected in accordance with the operation performed by the user on the screen configured based on the Web content data (the screen information and the display information) received from the server 2. In this example, the execution unit 263 notifies the processing execution unit 264 of the uninstallation command selected in accordance with the operation performed by the user, and the processing execution unit 264 executes the uninstallation command notified from the execution unit 263. The following describes details.

Figure 32:
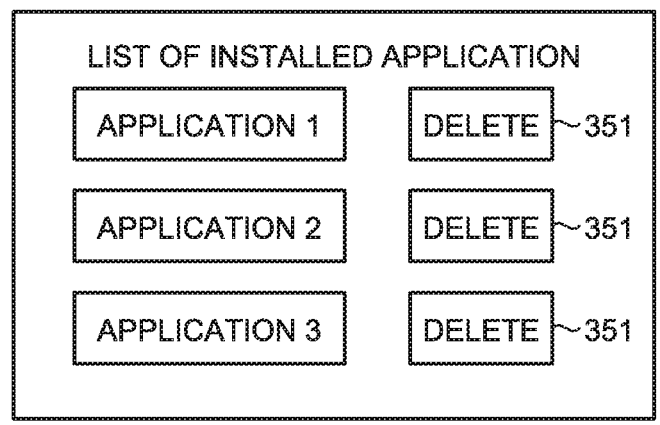
FIG. 32 is a diagram illustrating an example of a deletion instruction screen.
Figure 33:
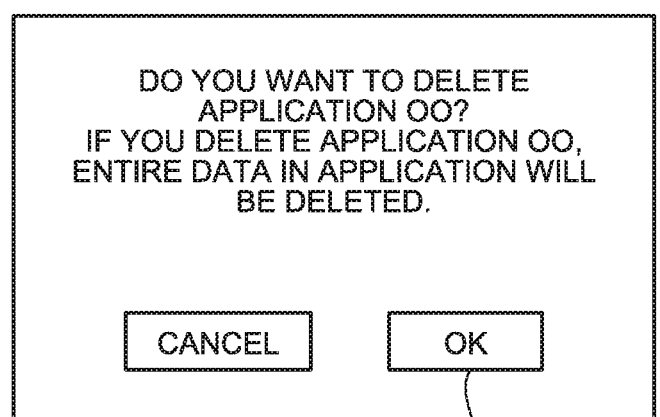
FIG. 33 is a diagram illustrating an example of a deletion confirmation screen.

When accepting pressing of the deletion select button 331 displayed on the application list screen illustrated in FIG. 23, the display control unit 262 performs control for displaying, on the operation panel 27, a deletion instruction screen for accepting a deletion instruction for the application for each application installed in the MFP 4. FIG. 32 is a diagram illustrating an example of the deletion instruction screen. The deletion instruction screen displays a deletion instruction button 351 for accepting the deletion instruction for the application for each application installed in the MFP 4. When accepting pressing of the deletion instruction button 351, the display control unit 262 performs control for displaying, on the operation panel 27, a deletion confirmation screen for finally confirming execution of uninstallation. FIG. 33 is a diagram illustrating an example of the deletion confirmation screen. The deletion confirmation screen displays a confirmation button 361 for instructing that execution of uninstallation is finally approved. In this example, a deletion command indicating a command to delete one or more applications corresponding to the confirmation button 361 is attached to the confirmation button 361. When accepting pressing of the confirmation button 361, the execution unit 263 notifies the processing execution unit 264 of the uninstallation command attached to the pressed confirmation button 361. FIG. 34 is a diagram illustrating an example of information notified from the execution unit 263 to the processing execution unit 264 in this case.

In this example, the deletion instruction button 351 described above is individually arranged for each application installed in the MFP 4, but the embodiment is not limited thereto. For example, a button may be arranged for instructing to collectively delete the applications installed in the MFP 4. In this configuration, when accepting pressing of the button, uninstallation commands for all applications installed in the MFP 4 are collectively selected. In short, the application command includes a collective uninstallation command indicating a command to collectively delete the applications installed in the MFP 4, and the execution unit 263 may be configured to notify the processing execution unit 264 of the uninstallation commands corresponding to the applications installed in the MFP 4 (one or more uninstallation commands corresponding to one or more installed applications in one-to-one correspondence) when the collective uninstallation command is selected.

The functions of the start unit 261, the display control unit 262, the execution unit 263, and the processing execution unit 264 described above can be implemented when the CPU 21 executes a computer program stored in a storage device such as the ROM 22 and the flash memory 24.

Figure 35:
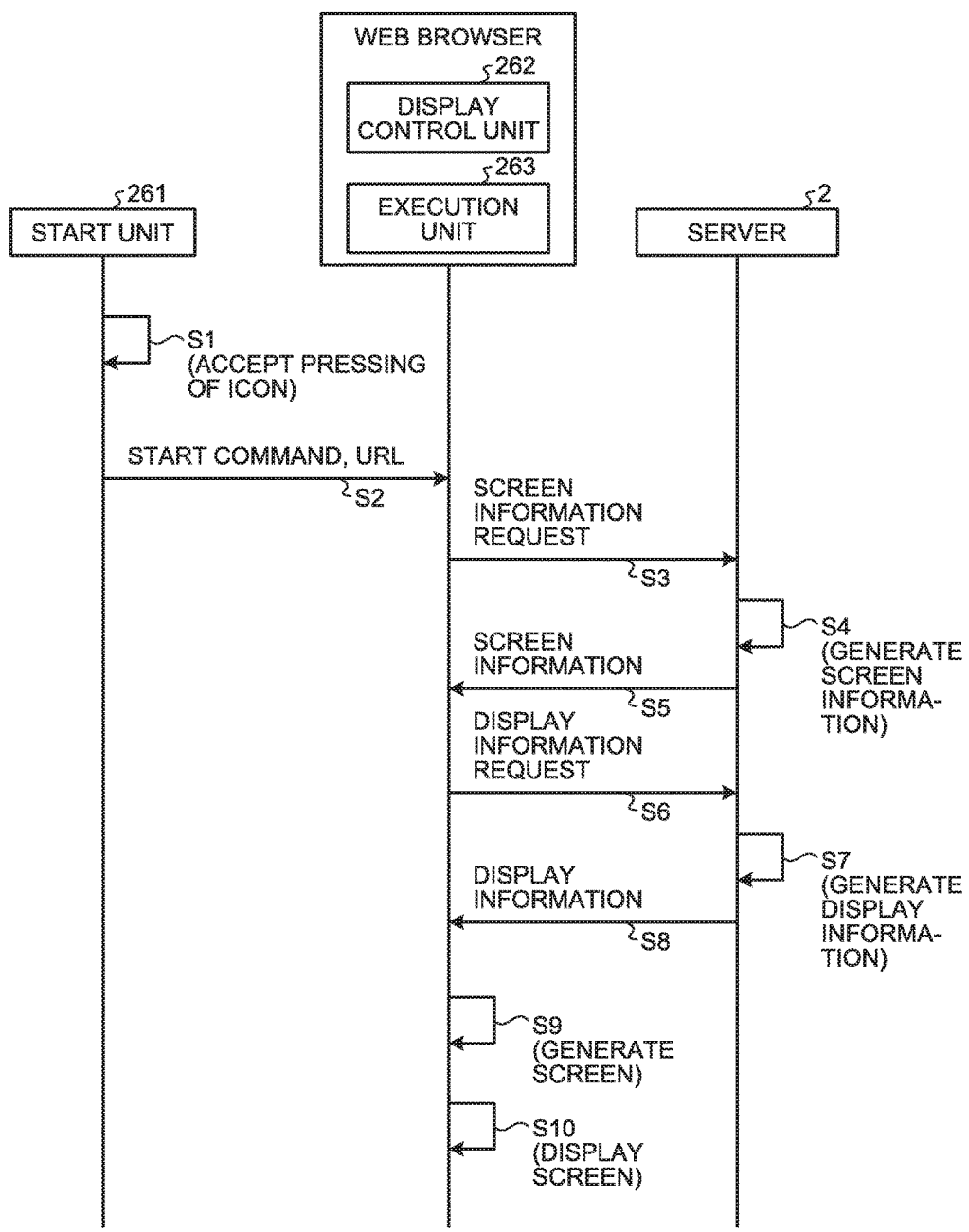
FIG. 35 is a sequence diagram illustrating an example of an operation procedure of the system.

FIG. 35 is a sequence diagram illustrating an example of an operation procedure of the system 1 according to the embodiment. As described above, when accepting pressing of the icon 5 having the name of "application market" on the operation screen (Step S1), the start unit 261 transmits a URL of the server 2 together with a start command to the browser application (the display control unit 262 and the execution unit 263) serving as a Web browser (Step S2). The browser application (the display control unit 262 and the execution unit 263) that has received the start command and been started transmits the screen information request described above, as an HTTP request, to the server 2 designated by the received URL (Step S3).

Next, the server 2 generates the Web content data (screen information) in response to the request from the MFP 4 (Step S4), and transmits the generated Web content data (screen information) to the MFP 4 as an HTTP response (Step S5). The MFP 4 (display control unit 262) receives the Web content data (screen information) as a response to the screen information request as an HTTP request. For example, the MFP 4 (display control unit 262) receives, as the Web content data (screen information), HTML and CSS/JavaScript included in HTML (or referred to by HTML).

The browser application of the MFP 4 that has received the screen information interprets and executes JavaScript, and transmits the display information request described above (refer to FIG. 21) as an HTTP request to the server 2 using Ajax (Step S6).

The server 2 generates display information in response to the request from the MFP 4 (Step S7), and transmits the generated Web content data (display information) to the MFP 4 as the HTTP response (Step S8). The MFP 4 (display control unit 262) receives the Web content data (display information) as a response to the display information request as an HTTP request.

The MFP 4 (display control unit 262) generates a screen configured based on the Web content data (the screen information and the display information) received from the server 2 (Step S9), and displays the generated screen on the operation panel 27 (Step S10). In this example, the display control unit 262 stores the Web content data (the screen information and the display information) received from the server 2 in a storage device such as the flash memory 24, and firstly generates the application list screen illustrated in FIG. 23 using the received Web content data (the screen information and the display information). The display control unit 262 then performs control for displaying the generated application list screen on the operation panel 27.

Figure 36:
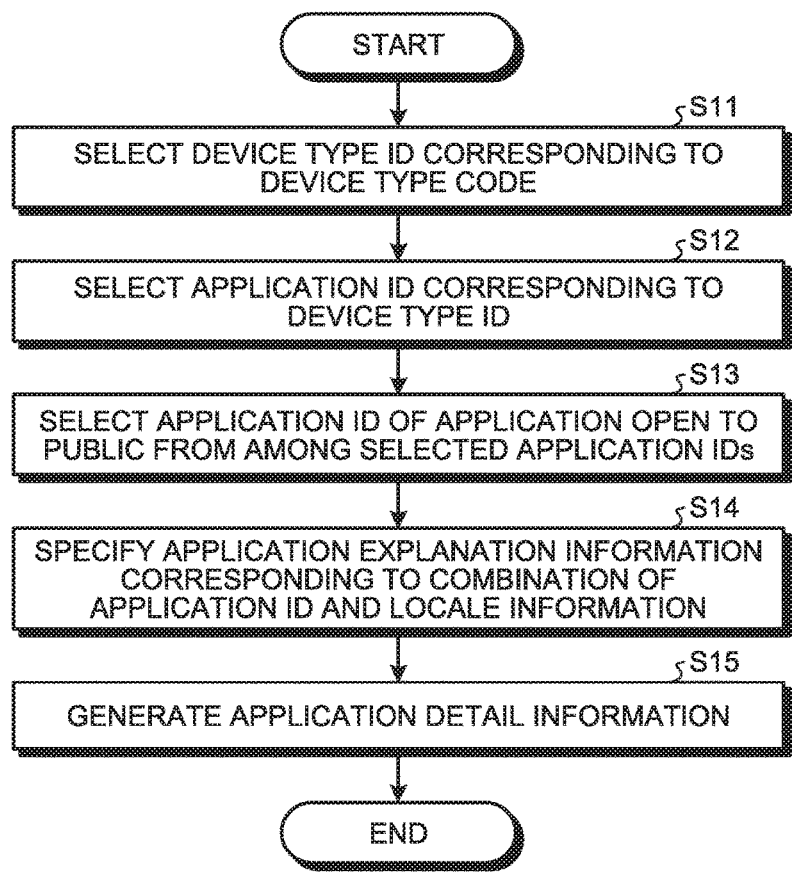
FIG. 36 is a flowchart illustrating an operation example of the server.

FIG. 36 is a flowchart illustrating an example of processing in which the server 2 generates the application detail information in which, with each application that can be used by the MFP 4, the detail information indicating details of the application is associated, at Step S7 described above. As illustrated in FIG. 36, when receiving the display information request described above from the MFP 4, the specification unit 216 refers to the first correspondence information illustrated in FIG. 5, and selects the device type ID associated with the device type code included in the received display information request (Step S11). Next, the specification unit 216 refers to the second correspondence information illustrated in FIG. 6, and selects one or more application IDs associated with the selected device type ID (Step S12).

Subsequently, the specification unit 216 refers to the third correspondence information illustrated in FIG. 7, and selects the application ID associated with the state information indicating the state in which the application is open to the public from among one or more selected application IDs (Step S13). At this point, the specification unit 216 specifies the version information associated with the application ID selected at Step S13 from among pieces of the second correspondence information illustrated in FIG. 6. The specification unit 216 then refers to the fourth correspondence information illustrated in FIG. 8, and specifies the application explanation information corresponding to a combination of the application ID selected at Step S13 and the language information (locale information) included in the display information request received from the MFP 4 (Step S14). The display information generation unit 217 can generate the application detail information by associating, with each application ID selected at Step S13, the detail information including the application explanation information specified at Step S14, the version information associated with the application ID selected at Step S13 among the pieces of second correspondence information illustrated in FIG. 6, and the license key if the license key is set (Step S15).

Figure 37:
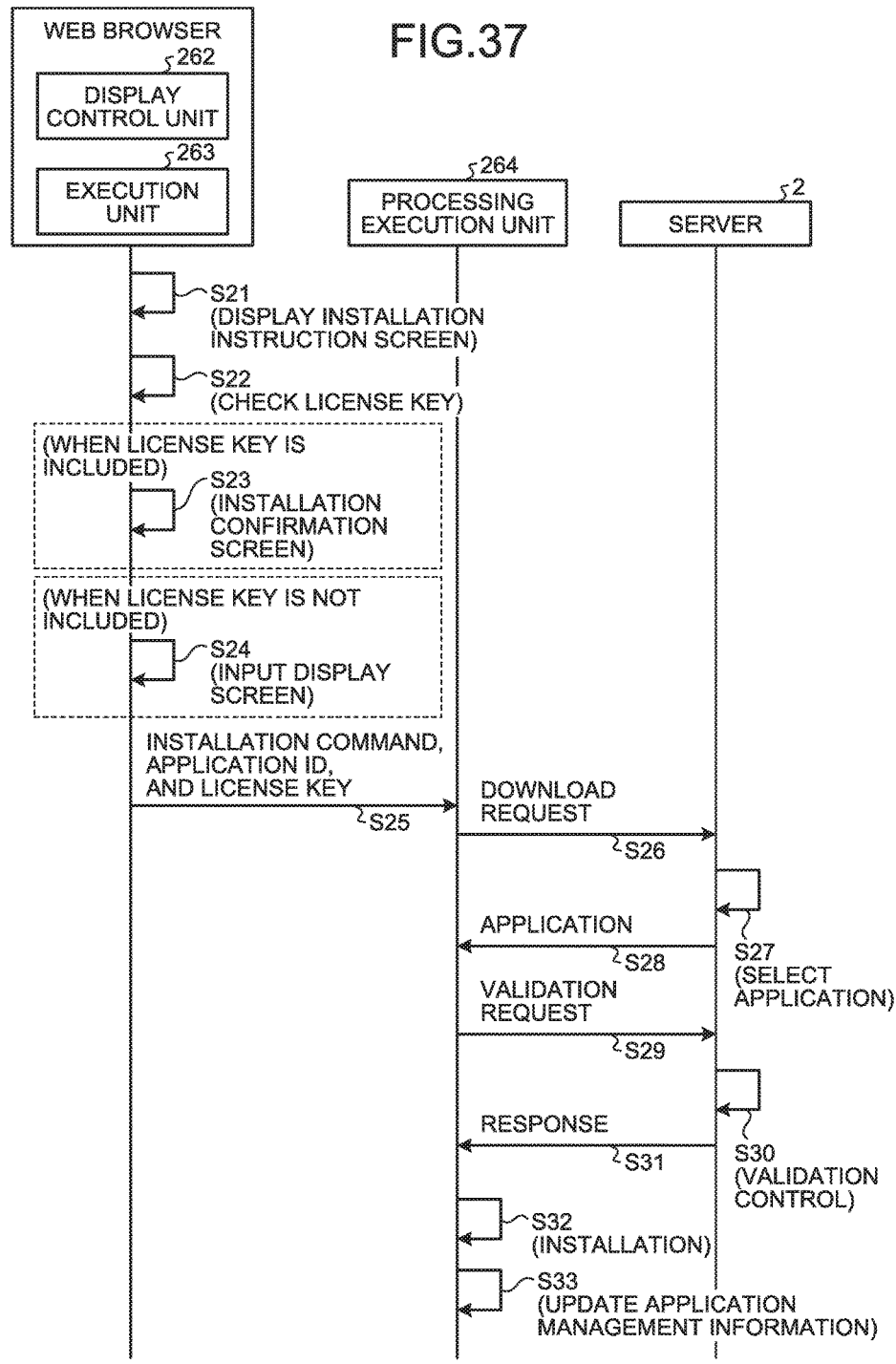
FIG. 37 is a sequence diagram illustrating an example of the operation procedure of the system.

FIG. 37 is a sequence diagram illustrating an example of the operation procedure of the system 1 in a case in which any application select button 311 displayed on the application list screen illustrated in FIG. 23 is pressed. As described above, when accepting pressing of any application select button 311, the display control unit 262 performs control for displaying the installation instruction screen described above (refer to FIG. 24) on the operation panel 27 (Step S21). Next, when accepting pressing of the installation button 312, the display control unit 262 refers to the display information received from the server 2, and checks whether the license key is included in the detail information corresponding to the application as a target of the installation command (the installation command attached to the pressed installation button 312) selected in accordance with the operation performed by the user in the application detail information in the display information (Step S22). As a check result at Step S22, if the license key is included therein, the display control unit 262 performs control for displaying the installation confirmation screen described above (refer to FIG. 25) on the operation panel 27 (Step S23).

As a check result at Step S22 described above, if the license key is not included therein (that is, if the application as a target of the installation command is a pay application), the display control unit 262 performs control for displaying the input screen described above on the operation panel 27 (Step S24), and accepts input of the license key from the user. In this case, the user is assumed to grasp the license key corresponding to a purchased application in advance. For example, an administrator of the application may notify the user who has purchased the application of the license key by mail, e-mail, and the like.

Next, the execution unit 263 notifies the processing execution unit 264 of the installation command selected in accordance with the operation performed by the user, the application ID (the application ID of the application as a target of the selected application command), and the license key (the license key of the application as a target of the selected application command) (Step S25). The processing execution unit 264 executes the installation command notified from the execution unit 263 using the license key notified from the execution unit 263. The following describes details. First, the processing execution unit 264 transmits, to the server 2, the download request described above that includes at least the application ID of the application as a target of the installation command and requests download of the application (Step S26). The server 2 (download unit 232) that has received the download request selects the application corresponding to the application ID included in the received download request (Step S27), and transmits the selected application to the MFP 4 (Step S28).

Next, the processing execution unit 264 transmits, to the server 2, the validation request described above that includes at least the application ID, the license key, and the machine number and requests validation of the license (Step S29). The server 2 (license validation unit 227) that has received the validation request performs control for validating the license (Step S30), and returns a response to the validation request to the MFP 4 (Step S31). Specific content of Step S30 has been described above. When receiving the validation request described above from the MFP 4, the license validation unit 227 checks whether the license key included in the received validation request is present in the license information DB 224. If the license key is present therein, the license validation unit 227 updates the information stored in the license information DB 224 as described above. The license validation unit 227 may issue a license file defining a license (use authority) such as an expiration date of the application identified with the application ID included in the validation request received from the MFP 4, and may transmit the license file in addition to notice of valid state of the license as a response to the validation request. On the other hand, if the license key included in the received validation request is not present in the license information DB 224, the license validation unit 227 transmits an error as a response to the validation request.

When receiving the notice of valid state of the license as a response to the validation request, the MFP 4 (processing execution unit 264) performs control for installing the application that is downloaded from the server 2 at Step S28 (Step S32). After the installation is completed, the processing execution unit 264 associates the application ID of the application that is completely installed with a version of the application at the time of installation to be added to the application management information described above to update the application management information (Step S33).

Figure 38:
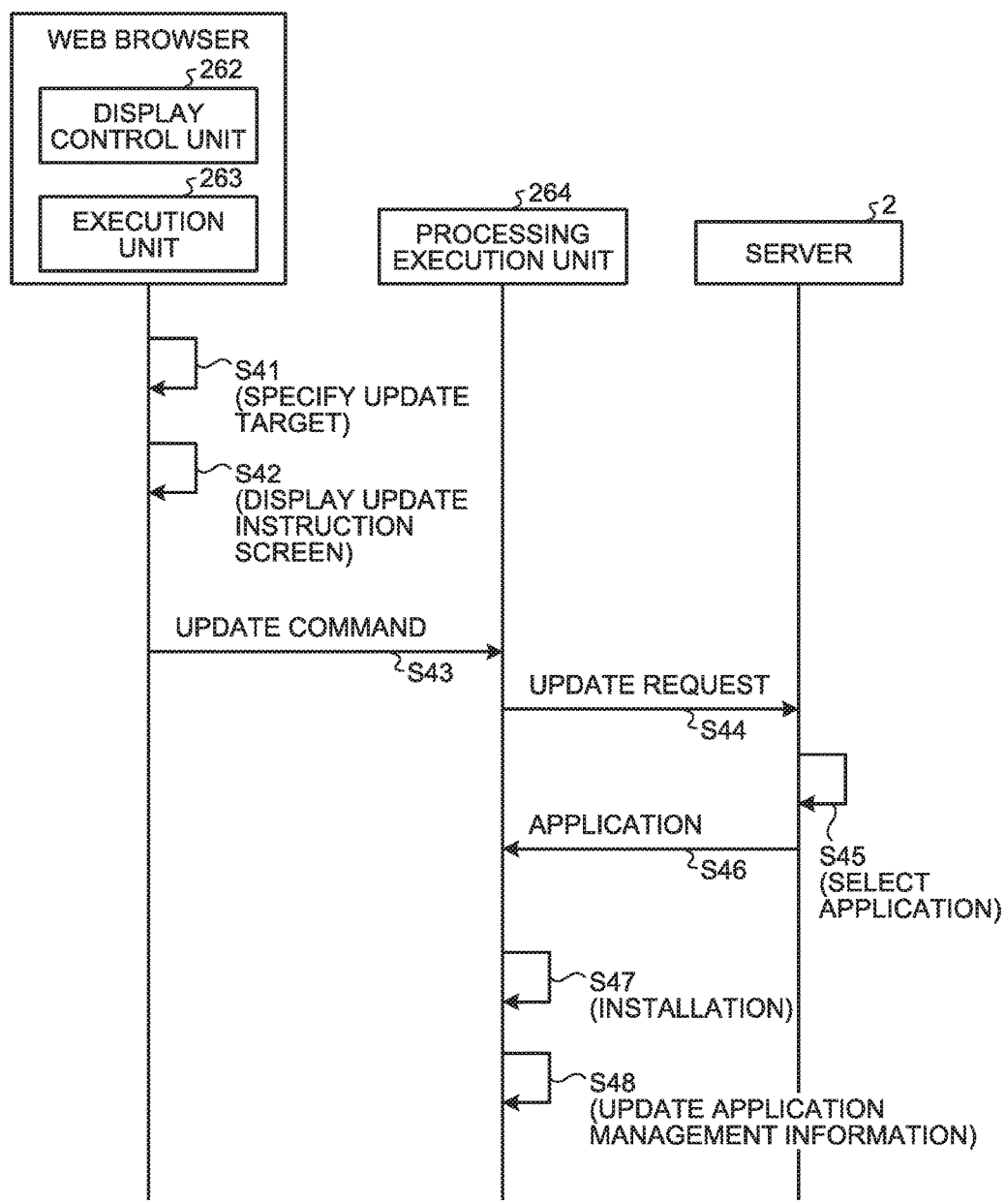
FIG. 38 is a sequence diagram illustrating an example of the operation procedure of the system.

FIG. 38 is a sequence diagram illustrating an example of the operation procedure of the system 1 in a case in which the update select button 321 displayed on the application list screen illustrated in FIG. 23 is pressed. As described above, when accepting pressing of the update select button 321, the display control unit 262 specifies the application as an update target from among the applications installed in the MFP 4 (Step S41). The display control unit 262 performs control for displaying, on the operation panel 27, the update instruction screen (refer to FIG. 30) for accepting an update instruction for the application for each application specified at Step S41 (Step S42). Specific content thereof has been described above.

Next, when accepting pressing of any update instruction button 341, the execution unit 263 notifies the processing execution unit 264 of the update command attached to the update instruction button 341 (Step S43). The processing execution unit 264 executes the update command notified from the execution unit 263. The following describes details. First, the processing execution unit 264 transmits, to the server 2, the update request that includes at least the application ID as an update target and requests the application of the latest version (Step S44). The server 2 that has received the update request selects the application corresponding to the application ID included in the received update request (Step S45), and transmits the selected application to the MFP 4 (Step S46).

Next, the MFP 4 (processing execution unit 264) performs control for installing the application received from the server 2 (the application newly downloaded) as a response to the update request (Step S47). After the installation is completed, the processing execution unit 264 associates the application ID of the application that is completely installed with a version of the application at the time of installation (at the time of update) to be added to the application management information to update the application management information (Step S48).

Figure 39:
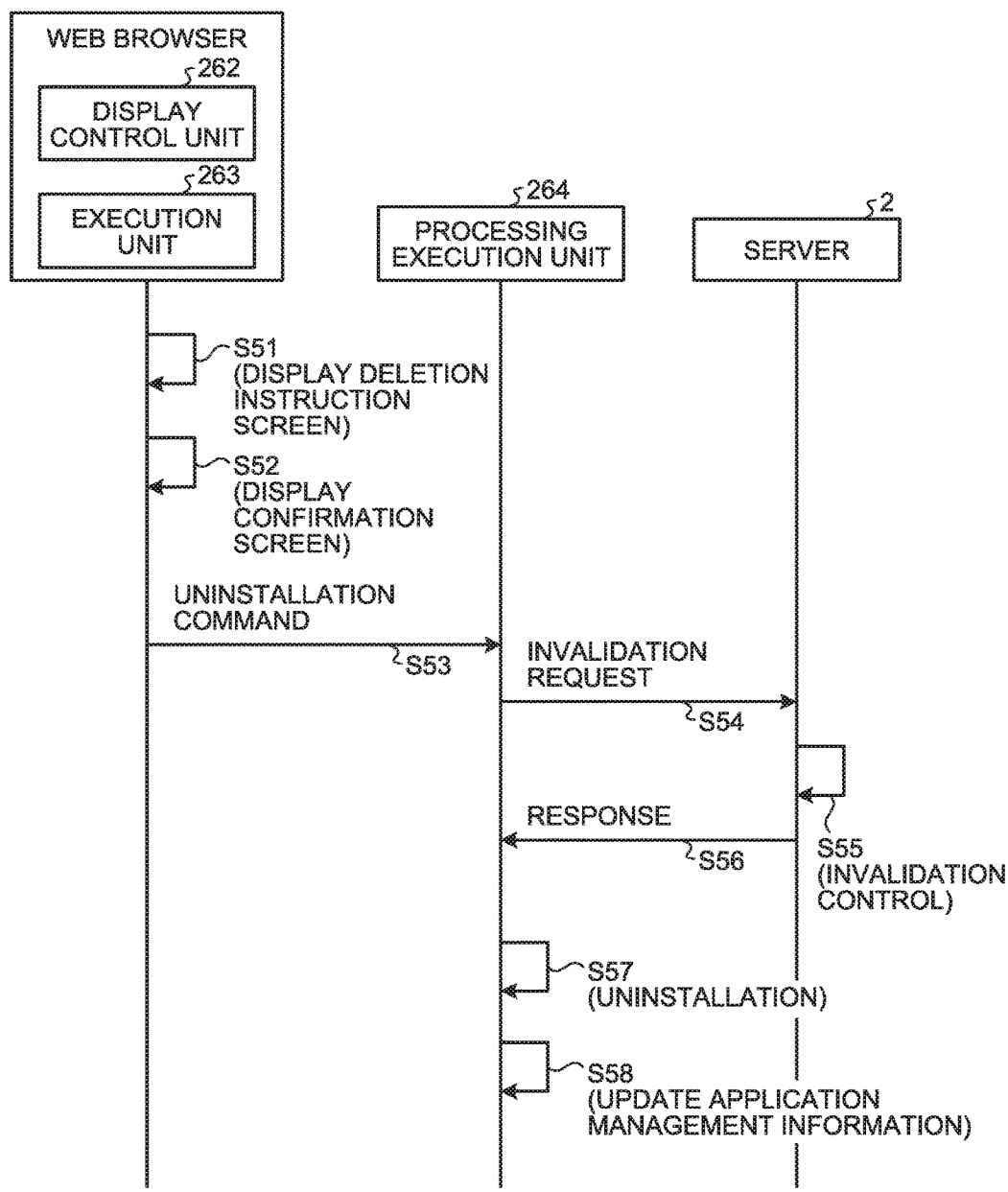
FIG. 39 is a sequence diagram illustrating an example of the operation procedure of the system.

FIG. 39 is a sequence diagram illustrating an example of the operation procedure of the system 1 in a case in which the deletion select button 331 displayed on the application list screen illustrated in FIG. 23 is pressed. As described above, when accepting pressing of the deletion select button 331, the display control unit 262 performs control for displaying the deletion instruction screen described above (refer to FIG. 32) on the operation panel 27 (Step S51). When accepting pressing of any deletion instruction button 351, the display control unit 262 performs control for displaying the deletion confirmation screen described above (refer to FIG. 33) on the operation panel 27 (Step S52). Next, when accepting pressing of the confirmation button 361 displayed on the deletion confirmation screen, the execution unit 263 notifies the processing execution unit 264 of the uninstallation command (the uninstallation command attached to the pressed confirmation button 361) selected in accordance with the operation performed by the user (Step S53).

The processing execution unit 264 executes the uninstallation command notified from the execution unit 263. The following describes details. First, the processing execution unit 264 transmits, to the server 2, the invalidation request described above that includes at least the machine number and the license key corresponding to the application as a target of the uninstallation command and requests invalidation of the license (Step S54). The server 2 (license invalidation unit 228) that has received the invalidation request performs control for invalidating the license (Step S55), and returns a response to the invalidation request (in this case, a response indicating the invalid state of the license) to the MFP 4 (Step S56). Specific content of Step S55 has been described above. When receiving the invalidation request described above from the MFP 4, the license invalidation unit 228 changes, into information indicating "invalid", the valid state information associated with a combination of the machine number and the license key included in the received invalidation request among pieces of information stored in the license information DB 224, decrements, by "1", the number of licenses in use associated with the license key included in the received invalidation request, and increments the number of used licenses by "1".

When receiving notice of invalid state of the license as a response to the invalidation request, the MFP 4 (processing execution unit 264) performs control for uninstalling the application corresponding to the license key included in the invalidation request (Step S57). After the uninstallation is completed, the processing execution unit 264 deletes information corresponding to the application that is completely uninstalled from the pieces of application management information described above to update the application management information (Step S58).

As described above, according to the embodiment, the server 2 includes the control unit 212 that performs control for transmitting, to the MFP 4, the Web content data including at least the display information indicating the application that can be used by the MFP 4 in response to the request from the MFP 4 connected thereto via the network 3 and the application command that causes the MFP 4 to perform processing related to the application. The MFP 4 includes the display control unit 262 that performs control for displaying, on the operation panel 27, the screen based on the Web content data received from the server 2, and the execution unit 263 that executes the application command included in the Web content data in accordance with the operation performed by the user via the screen displayed on the operation panel 27 and requests the MFP 4 to perform processing related to the application corresponding to the application command. Accordingly, even if the display information is freely changed by the server 2, the application command included in the Web content data can be executed by the MFP 4, so that the computer program on the MFP 4 side is not required to be changed in accordance with the change in the display information. That is, the embodiment can implement a mechanism in which the server 2 that provides a page for introducing the application that can be used by the MFP 4 establishes pages each including display content different for each region, for example.

The embodiment of the present invention has been described above, but the embodiment is not limited thereto. At an implementation phase, the components can be modified to be embodied without departing from the gist of the invention. By appropriately combining a plurality of components disclosed in the embodiment described above, various inventions can be made. For example, some components may be eliminated from all the components disclosed in the embodiment.

Figure 40:
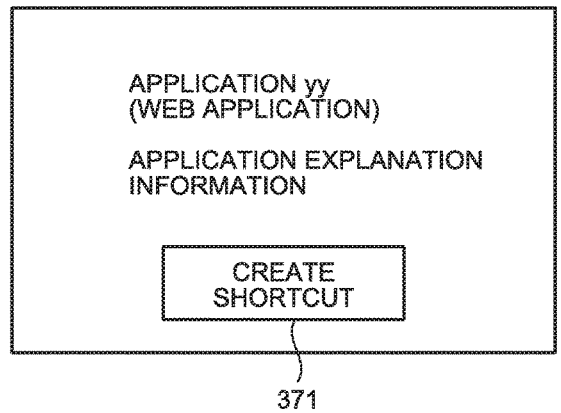
FIG. 40 is a diagram illustrating an example of a shortcut creation instruction screen.

For example, the applications displayed in the application list screen illustrated in FIG. 23 (applications that can be used by the MFP 4) may include an application (that is, a Web application) in a form of using the application arranged in the server 2 with the browser application of the operation unit 20. Such a Web application is not required to be installed in the MFP 4, so that the display control unit 262 may be configured to perform control for displaying, on the operation panel 27, the shortcut creation instruction screen illustrated in FIG. 40, for example, when accepting pressing of the application select button 311 corresponding to the Web application. The shortcut creation instruction screen displays the application explanation information of the corresponding application (Web application) and a shortcut creation button 371 for instructing to create a shortcut icon for calling a function of the Web application. In this example, a shortcut creation command indicating a command to create a shortcut icon is attached to the shortcut creation button 371. When accepting pressing of the shortcut creation button 371, the execution unit 263 notifies the processing execution unit 264 of the shortcut creation command attached to the shortcut creation button 371. The processing execution unit 264 then executes the shortcut creation command notified from the execution unit 263. In short, the application command may include a shortcut icon creation command indicating a command to create a shortcut icon for calling the function of the Web application. In this case, when the shortcut icon creation command is selected in accordance with the operation performed by the user (for example, when the shortcut creation button 371 described above is pressed), the execution unit 263 may notify the processing execution unit 264 of the selected shortcut icon creation command (the shortcut creation command attached to the pressed shortcut creation button 371), and the processing execution unit 264 may execute the shortcut icon creation command notified from the execution unit 263. For example, when the application required to be installed and the Web application coexist in the display information received from the server 2 by the MFP 4, "appType" in the detail information in FIG. 22 may be referred to. Subsequently, the application may be determined to be required to be installed and FIG. 24 may be displayed if a value is "install", and the application may be determined to be the Web application and FIG. 40 may be displayed if the value is "web".

For example, the operation unit 20 (MFP 4) may further include a function of managing authority information in which, with each of a plurality of users, authority of the user is associated (authority information management unit). The display control unit 262 may refer to the authority information acquired from the authority information management unit, and when the authority associated with the user who is using the MFP 4 (the user who is recognized to have authority for using the MFP 4, a user who is logging in) is not allowed to instruct to execute installation, for example, the display control unit 262 can cause the installation button 312 illustrated in FIG. 24 not to be displayed. Similarly, when the authority associated with the user who is using the MFP 4 is not allowed to instruct to execute update, for example, the display control unit 262 can cause the update instruction button 341 illustrated in FIG. 30 not to be displayed. When the authority associated with the user who is using the MFP 4 is not allowed to instruct to execute uninstallation, for example, the display control unit 262 can cause the deletion instruction button 351 illustrated in FIG. 32 not to be displayed.

According to the embodiment, the main body 10 and the operation unit 20 operate independently of each other in different operating systems, but the embodiment is not limited thereto. For example, the main body 10 and the operation unit 20 may be configured to operate in the same operating system. That is, the main body 10 and the operation unit 20 may be integrally configured.

Figure 41:
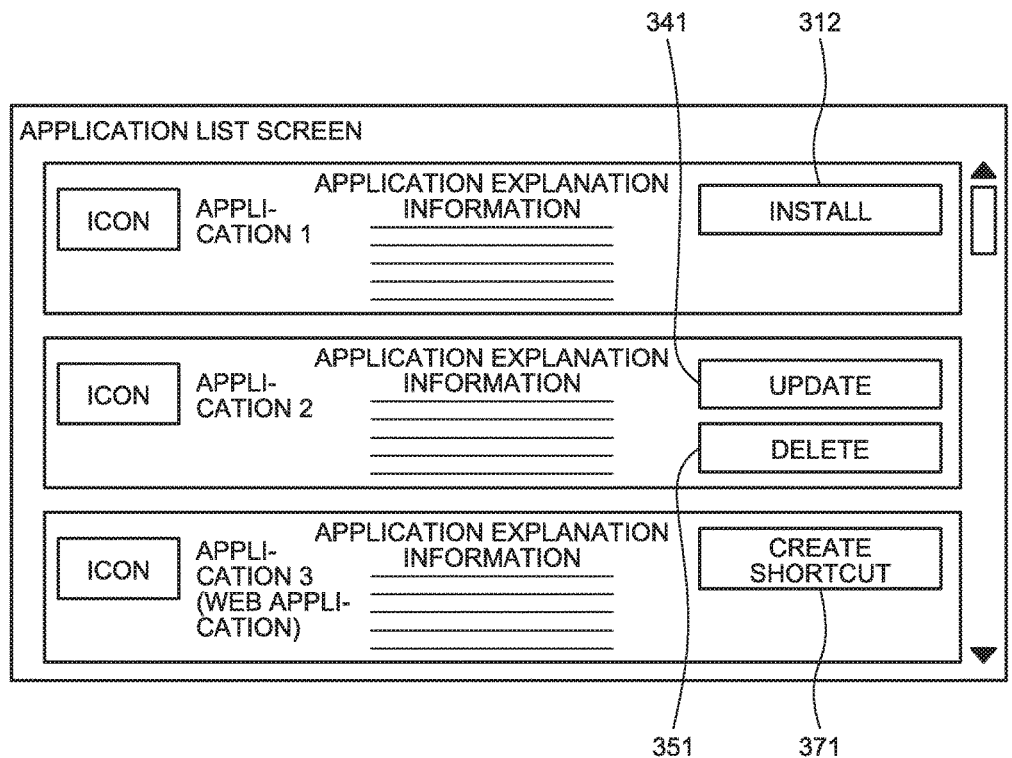
FIG. 41 is a diagram illustrating an example of the application list screen according to a modification.

The format of the application list screen described above is optional. For example, a format in which above examples are combined may be used as illustrated in FIG. 41.

For example, the screen providing unit 213 described above may be configured to generate the Web content data including the application command described above only when receiving the screen information request described above from the image forming device including the MFP 4. That is, the screen providing unit 213 may be configured, when receiving the screen information request from a device (a PC, a tablet computer, and the like) other than the image forming device, to generate the Web content data not including the application command and transmit the generated Web content data to the device as a response to the screen information request. In this configuration, the screen providing unit 213 described above may be configured, when receiving the screen information request from the device other than the image forming device, to generate the Web content data not including information (a button) for selecting the application command (the installation command, the update command, the uninstallation command, and the like), and transmit the generated Web content data to the device as a response to the screen information request. Any method can be used for determining whether the screen information request received from the device is the screen information request from the MFP 4. For example, determination may be made with a User-Agent header, or device authentication may be performed (to authenticate whether the device is the MFP 4) at the time of first access from the MFP 4. For example, the device may be determined to be other than the MFP 4 in a case in which an error arises when executing a command for the MFP 4 using JavaScript.

The computer program executed by the system 1 (the server 2, the MFP 4, and the like) according to the embodiment described above may be configured to be recorded and provided in a computer-readable recording medium such as a compact disc read only memory (CD-ROM), a flexible disk (FD), a compact disc recordable (CD-R), a digital versatile disc (DVD), and a universal serial bus (USB) as an installable or executable file, or may be configured to be provided or distributed via a network such as the Internet. The various computer programs may be configured to be embedded and provided in a ROM, for example.

According to an embodiment, a server that provides a page for introducing an application that can be used by a device can establish pages each including display content different for each region, for example.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A system comprising:
a server; and
at least one device connected to the server via a network,
the server including,
a control unit configured to send Web content data to a first device of the at least one device in response to a first request from the first device, the Web content data including at least
display information indicating at least one device application that is able to be used by the first device, and
at least one application command to cause the first device to perform processing related to the at least one device application,
the first device including,
a Web browser including,
a display control unit configured to display a screen based on the Web content data received from the server on a display unit; and
an execution unit configured to send a second request for execution of a first application command of the at least one application command included in the Web content data, the second request being in accordance with an operation performed by a user via the screen; and
a processing execution unit configured to, based on receiving the second request from the Web browser, perform processing related to a first application of the at least one device application based on the second request, the first application corresponding to the first application command.

2. The system according to claim 1, wherein the execution unit includes an application programming interface.

3. The system according to claim 1, wherein
the server further includes,
a storage unit configured to store, for each of a plurality of server-based applications,
state information indicating whether the server-based application is open to the public, and
device type information for identifying at least one device type of the at least one device that is able to use the server-based application,
in association with each other, and
the control unit includes,
a screen providing unit configured to,
receive a screen information request from the first device,
generate screen information in response to receiving the screen information request, and
send the generated screen information to the first device;
a specification unit configured to,
receive a display information request that includes first device type information from first the device,
specify at least one available application of at least one server-based application by referencing the storage unit in response to receiving the display information request, the at least one available application corresponding to a combination of the first device type information and the state of being open to the public; and a display information generation unit configured to,
generate the display information indicating the at least one available application specified by the specification unit, and
send the generated display information to the first device.

4. The system according to claim 3, wherein the specification unit and the display information generation unit each include an application programming interface.

5. The system according to claim 1, wherein the server further includes a setting unit configured to set the display information variably in accordance with an operation performed by the user.

6. The system according to claim 1, wherein the at least one application command includes an installation command to install an application of the at least one device application.

7. The system according to claim 6, wherein
the execution unit is further configured to notify the processing execution unit of the installation command in response to the installation command being selected in accordance with the operation performed by the user, and
the processing execution unit is further configured to execute the installation command in response to receiving notification from the execution unit.

8. The system according to claim 6, wherein
the execution unit is further configured to notify the processing execution unit of a license key used for authenticating use authority of the application as a target of the installation command selected in accordance with the operation performed by the user if the display information includes the license key and the installation command, and
the display control unit is further configured to perform control for displaying an input screen for urging input of the license key if the display information does not include the license key.

9. The system according to claim 1, wherein the at least one application command includes an update command to update an application of the at least one device application.

10. The system according to claim 9, wherein
the display information further includes application detail information for each device application able to be used by the first device including at least the latest version of the device application,
the execution unit is further configured to,
specify, from among at least one installed application installed in the device, a first installed application having a current version different from the latest version indicated by the application detail information corresponding to the first installed application in accordance with the operation performed by the user, and
notify the processing execution unit of the update command if the update command corresponding to the first installed application is selected, and
the processing execution unit is further configured to execute the update command notified from the execution unit.

11. The system according to claim 10, wherein the display control unit is further configured to display information indicating a number of installed applications among the at least one installed application having current versions different from the latest versions indicated by the application detail information corresponding to the installed applications.

12. The system according to claim 10, wherein
the at least one application command includes a collective update command to collectively update installed applications among the at least one installed application having respective current versions different from the latest versions indicated by the application detail information corresponding to the installed application, and
the execution unit is further configured to,
specify, in response to the collective update command being selected, the installed applications among the at least one installed application having respective current versions different from the latest versions indicated by the application detail information corresponding to the respective installed application, and
notify the processing execution unit of the collective update command corresponding to the specified installed applications.

13. The system according to claim 6, wherein the at least one application command includes an uninstallation command to delete an installed application to return the first device to a state before the application was installed.

14. The system according to claim 9, wherein the at least one application command includes an uninstallation command to delete an installed application to return the first device to a state before the application was installed.

15. The system according to claim 13, wherein
the execution unit is further configured to notify the processing execution unit of the uninstallation command selected in accordance with the operation performed by the user, and
the processing execution unit is further configured to execute the uninstallation command in response to the notification from the execution unit.

16. The system according to claim 13, wherein
the at least one application command includes a collective uninstallation command to collectively delete applications installed in the first device, and
the execution unit is first configured to notify the processing execution unit of the collective uninstallation commands corresponding to the applications installed in the device if the collective uninstallation command is selected.

17. The system according to claim 1, wherein
the at least one application command includes a shortcut icon creation command to create a shortcut icon for calling a function of a Web application,
the execution unit is further configured to notify the processing execution unit of the shortcut icon creation command if the shortcut icon creation command is selected in accordance with the operation performed by the user, and
the processing execution unit is further configured to execute the shortcut icon creation command notified from the execution unit.

18. The system according to claim 3, wherein the screen providing unit is further configured to,
generate the screen information without the at least one application command, and
send the generated screen information to the first device in response to the screen information request if the first device is not an image forming device.

19. An image forming device connected to a server via a network, the image forming device comprising:
- a Web browser including,
    - a display control unit configured to display a screen based on Web content data on a display unit, the Web content data including at least
        - display information received from the server and indicating at least one application that is able to be used by the image forming device, and
        - at least one application command to cause the image forming device to perform processing related to the at least one application; and
    - an execution unit configured to request execution of an application command of the at least one application command included in the Web content data in accordance with an operation performed by a user via the screen; and
- a processing execution unit configured to perform processing related to an application of the at least one application based on the request from the Web browser, the application corresponding to the application command.

20. An information processing method for a system that includes a server and at least one device connected to the server via a network, the information processing method comprising:
- sending, by the server, Web content data to a first device of the at least on device in response to a request from the first device, the Web content data including at least
    - display information indicating at least one application that is able to be used by the first device, and
    - at least one application command to cause the first device to perform processing related to the at least one application;
- displaying, by a Web browser of the first device, a screen based on the Web content data received from the server;
- detecting, by the Web browser, execution of an application command of the at least one application commands included in the Web content data in accordance with an operation performed by a user via the screen; and
- performing, by a processing execution unit of the first device, processing related to an application of the at least one application corresponding to the application command in response to the detection.

* * * * *